United States Patent [19]

Kanno et al.

[11] Patent Number: 4,908,294

[45] Date of Patent: Mar. 13, 1990

[54] OPTICAL INFORMATION RECORDING MEDIUM

[75] Inventors: Toshiyuki Kanno; Hitoshi Watanabe; Kohei Hamanishi, all of Tokyo, Japan

[73] Assignee: Olympus Optical Co., Ltd., Tokyo, Japan

[21] Appl. No.: 11,896

[22] Filed: Feb. 6, 1987

[30] Foreign Application Priority Data

| Feb. 13, 1986 | [JP] | Japan | 61-29328 |
| Feb. 14, 1986 | [JP] | Japan | 61-30151 |
| Feb. 19, 1986 | [JP] | Japan | 61-34716 |
| Feb. 20, 1986 | [JP] | Japan | 61-35491 |
| May 8, 1986 | [JP] | Japan | 61-105290 |

[51] Int. Cl.$^4$ .................. G11B 7/24; G03C 1/72; G03C 5/16; B41M 5/26

[52] U.S. Cl. .................. 430/270; 430/495; 430/945; 346/135.1

[58] Field of Search .......... 430/945, 495, 270; 346/135.1

[56] References Cited

U.S. PATENT DOCUMENTS

| 4,626,496 | 12/1986 | Sato | 430/945 |
| 4,652,514 | 3/1987 | Abe et al. | 430/495 |
| 4,735,889 | 4/1988 | Namba et al. | 430/945 |

FOREIGN PATENT DOCUMENTS

| 55-22961 | 2/1980 | Japan . |
| 57-66541 | 4/1982 | Japan . |
| 58-112790 | 7/1983 | Japan . |
| 58-224448 | 12/1983 | Japan . |
| 58-224793 | 12/1983 | Japan . |
| 24692 | 2/1984 | Japan . |
| 55795 | 3/1984 | Japan . |
| 67092 | 4/1984 | Japan . |
| 59-215892 | 12/1984 | Japan . |
| 60-48396 | 3/1985 | Japan . |
| 2165658 | 4/1986 | United Kingdom . |

*Primary Examiner*—Paul R. Michl
*Assistant Examiner*—Mark R. Buscher
*Attorney, Agent, or Firm*—Frishauf, Holtz, Goodman & Woodward

[57] ABSTRACT

An optical information recording medium includes an optical information recording layer supported on a substrate. The recording layer contains an organic dye represented by general formula:

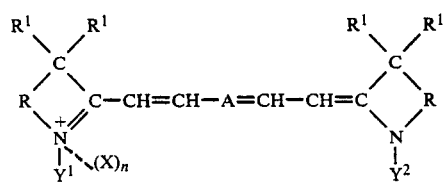

where R is 1,2-naphthylene group, 2,3-naphthylene group, 3,4-naphthylene group, or

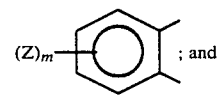

; and A is 12 Claims, 2 Drawing Sheets

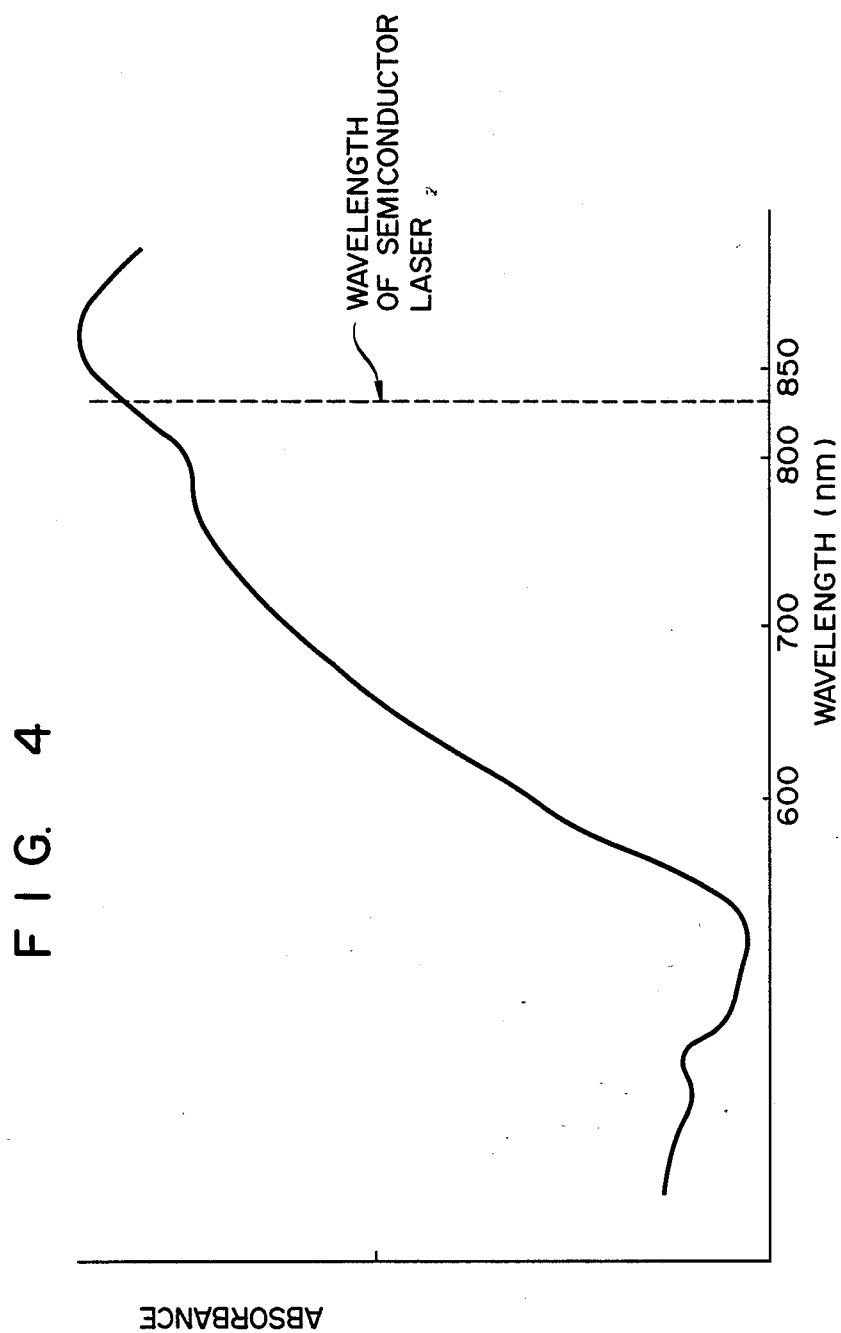

OPTICAL INFORMATION RECORDING MEDIUM

BACKGROUND OF THE INVENTION

1. Field of the Invention

The present invention relates to an optical information recording medium subjected to information write or read access with a laser, especially a semiconductor laser.

2. Description of the Prior Art

In a conventional optical disk, optically detectable pits (e.g., a size of about 1 μm) are formed in a thin recording layer on a substrate to allow high-density recording of information in spiral or concentric tracks. In order to write information on such a disk, a laser spot formed on a laser-sensitive layer is scanned to form pits on only the irradiated surface portions. In this case, the pits are formed in a spiral or concentric form. The laser-sensitive layer (recording layer) absorbs laser energy and allows formation of optically detectable pits. For example, in a heat mode write system, a recording layer absorbs laser energy and an irradiated portion is locally heated and subjected to physical changes such as melting/evaporation or coagulation so as to cause an optical difference (e.g., reflectance or absorbance) between the irradiated and nonirradiated portions. Information can be read out by detecting such physical changes.

Examples of the conventional optical recording layer materials are a thin metal film (e.g., an aluminum deposition film), a thin bismuth film, or a thin tellurium film, and an inorganic material such as a chalcogenide-based amorphous glass film. These materials have advantages in that a thin film can be prepared by deposition, sputtering, or the like and has an absorption property in the near-infrared range so as to allow use of a semiconductor laser. However, these materials have disadvantages such as high reflectances, high heat conductances, and high specific heat values. In particular, the high reflectance disables effective utilization of laser energy. Laser energy required for recording must have a high level, and a large-capacity laser source must be used. As a result, the recording apparatus is undesirably bulky and expensive. Furthermore, thin telurium, bismuth and selenium films are undesirably toxic.

Under these circumstances, extensive studies have been recently made to develop optical memory media using thin dye films as recording layers since dyes provide a wide variety of absorbances, have large absorbances and small heat conductivities, and are easy to prepare and nontoxic. Typical examples of the dye are a cyanine dye (Japanese Patent Disclosure (Kokai) No. 58-112790), an anthraquinone dye (Japanese Patent Disclosure (Kokai) No. 58-224448), a naphthoquinone dye (Japanese Patent Disclosure (Kokai) No. 58-224793), and a phthalocyanine dye (Japanese Patent Disclosure (Kokai) No. 60-48396). These dyes may be used singly, mixed with a self-oxidizable resin, or used in the form of a composition obtained by chemically bonding such a dye to a self-oxidizable resin. The dye material is applied to a substrate by spinner coating/dipping method, a plasma method, or a vacuum deposition method to prepare an optical recording medium. The thin dye film has the above-mentioned advantages. In particular, the cyanine dye can have a structure for absorbing near-infrared rays and has high solvent solubility and low melting point. Therefore, the cyanine dye has received a great deal of attention.

However, the conventional dyes as described above are subjected to degradation by light, instability against heat, and degradation by humidity. These dyes are thus regarded as posing problems on reservation for long periods of time and read operation stability (stability with respect to read light). Various proposals for solving these problems have been presented. For example, a protective film is formed on the recording layer (Japanese Patent Disclosure (Kokai) Nos. 55-22961 and 57-66541); an antifading material is mixed with the conventional dye (Japanese Patent Disclosure (Kokai) No. 59-55795); and a metal complex having absorbance in the range of long wavelengths is mixed in the conventional dye to prepare a recording layer (Japanese Patent Disclosure (Kokai) No. 59-215892). These proposals, however, cannot completely solve the problems as described above. These additives undesirably reduce a film formation property, a reflectance, and an absorbance.

Under these circumstances, a coating type recording medium using a cyanine dye represented by the following general formula has received a great deal of attention in favor of a high recording density and a reflectance:

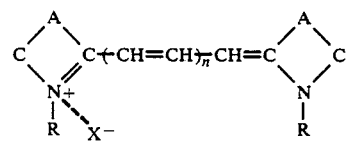

wherein A is O, S, Se, or C; X is a halogen anion, e.g., $BF_4-$ or $ClO_4-$; and R is an alkyl group.

The film formation property and thermal/optical stability of the cyanine dye represented by the above general formula are essentially unsatisfactory. As to the film formation property, an increase in the number (n) of methine chains degrades solubility of the cyanine dye in a solvent. Solubility of the dye is changed according to the types of heterocyclic moieties at both ends and the types of substituent. As to thermal/optical stability, an increase in the number of methine chains causes instability against heat and light and oxidative degradation of the dye. Thermal/optical stability is known to vary according to the types of heterocyclic moieties.

SUMMARY OF THE INVENTION

It is, therefore, an object of the present invention to provide a nontoxic optical information recording medium having a high reflectance and high recording sensitivity, capable of stably writing or reading an optical signal, and having high stability against light, sunbeams, and humidity in the read mode.

According to the present invention, there is provided an optical information recording medium comprising: an optical information recording layer; and a carrier carrying said recording layer, said recording layer comprising an organic dye represented by general formula:

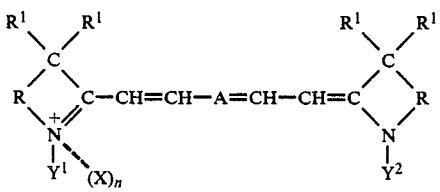

where
R is 1,2-naphthylene group, 2,3-naphthylene group, 3,4-naphthylene group, or

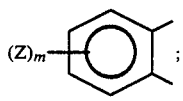

m is 1 or 2;
n is 0 or 1;
$R^1$ is an alkyl group having 1 to 6 carbon atoms, an aralkyl group (preferably, a phenyl-$C_1$-$C_6$ alkyl group) or phenyl group;
A is

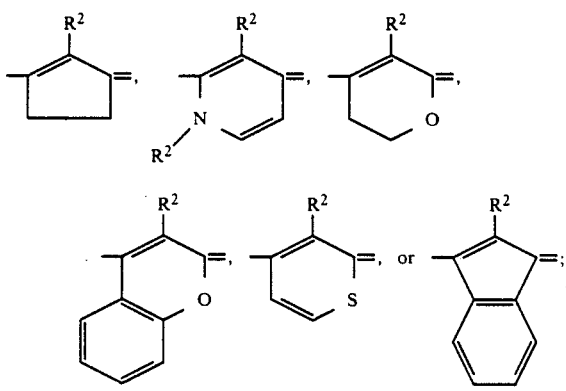

$R^2$ is a hydrogen atom, a halogen atom, an alkyl group having 1 to 6 carbon atoms,

(where Ph is phenyl group), allyl group, diphenylamino group, phenyl group, an aralkyl group (preferably, a phenyl C1-C6 alkyl)

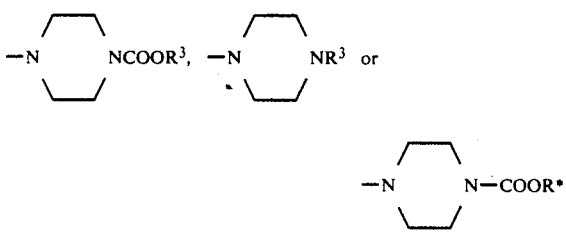

$R^3$ is an alkyl group having 1 to 6 carbon atoms;
$R^*$ is said $R^3$, or an aralkyl group (preferably, a phenyl $C_1$-$C_6$ alkyl) or phenyl group;
X is an anion;

$Y^1$ is an alkyl group having 1 to 20 carbon atoms, phenyl group, —$R^4$OH, —$R^4$COOH, —$R^4$OR$^5$, —$R^4$COH, —$R^4$COR$^5$, —$R^4$COOR$^5$, —CH(R**)Ph (where Ph is phenyl),

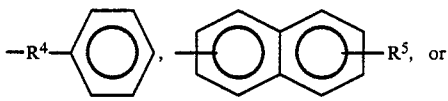

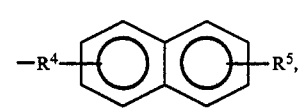

when n is 1, and is —$R^6SO_3$—, when n is 0;
$Y^2$ is said $Y^1$ when n is 1, and is —$R^6SO_3Na$, or —$R^6$-$SO_3NH(R^7)_3$, when n is 0;
$R^4$ is an alkylene group having 1 to 20 carbon atoms and preferably 1 to 10 carbon atoms;
$R^5$ is an alkyl group having 1 to 18 carbon atoms and preferably 1 to 10 carbon atoms, or phenyl group;
$R^6$ is an alkylene group having 1 to 20 carbon atoms and preferably 1 to 10 carbon atoms, o an aralkyl group (preferably, a phenyl $C_1$-$C_6$ alkyl);
$R^7$ is an alkyl group having 1 to 18 carbon atoms and preferably 1 to 10 carbon atoms;
R** is a substituted or unsubstituted alkyl group having 1 to 18 carbon atoms and preferably 1 to 10 carbon atoms, or allyl group;
Z is phenyl group, —OH, —COOH, —CN, —OCF$_3$, —OSF$_3$, —$R^8$OH, —$R^8$CHO, —$R^8$COOH, —$R^8$OR$^9$, —$R^8$COR$^9$,

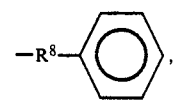

—$R^8$CN, —OR$^9$, —COR$^9$, —NH$_2$N(R$^9$)$_2$, —NHCOR$^9$, —$R^8$—COOR$^{10}$ or

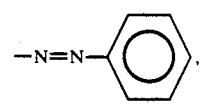

when m is 1, and is said Z, or an alkyl group having 1 to 10 carbon atoms, or a halogen atom, when m is 2;
$R^8$ is an alkylene group having 1 to 20 carbon atoms and preferably 1 to 10 carbon atoms;
$R^9$ is an alkyl group having 1 to 18 carbon atoms and preferably 1 to 10 carbon atoms, or phenyl group; and
$R^{10}$ is a substituted or unsubstituted alkyl group having 1 to 18 carbon atoms and preferably 1 to 10 carbon atoms, or allyl group.

BRIEF DESCRIPTION OF THE DRAWINGS

FIG. 4 is a graph showing changes in absorbance of the present recording medium with respect to light wavelength.

DESCRIPTION OF THE PREFERRED EMBODIMENTS

Figure 1:
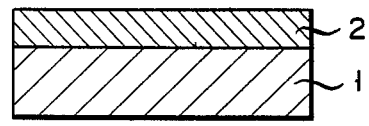
FIGS. 1 to 3 are schematic views showing optical information recording media having different structures according to the present invention.

An optical information recording medium according to the present invention can be prepared as described below such that an organic dye represented by general formula (I) is formed as an optical information recording layer on a proper carrier or substrate.

In general formula (I), A is preferably

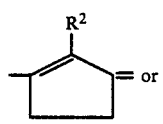  or

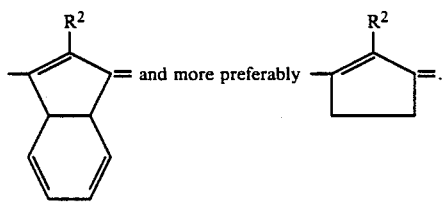  and more preferably

X is, usually, a perchlorate anion, a fluoroborate anion, an iodide anion, a chloride anion, a bromide anion, or a p-toluenesulfonate anion. X is preferably a perchlorate or iodide anion.

According to first embodiment of the present invention, the organic dye used in the invention is represented by a formula:

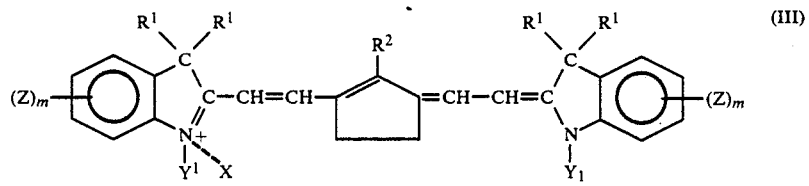

wherein
R is 1,2-, 2,3-, or 3,4-naphthylene group;
$R^1$ is as defined above;
$R^2$ is a hydrogen atom, a halogen atom, an alkyl group having 1 to 6 carbon atoms,

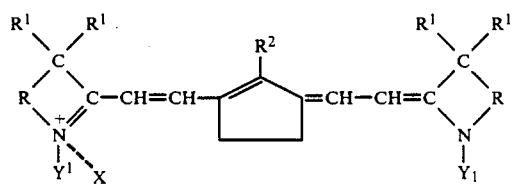

wherein Ph is a phenyl group) or

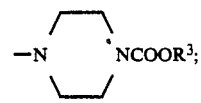

$R^3$ is as defined above;
X is a perchlorate anion, a fluoroborate anion, an iodide anion, a chloride anion, a bromide anion, or a p-toluenesulfonate anion;
$Y^1$ is an alkyl group having 1 to 18 carbon atoms and preferably 1 to 10 carbon atoms, a phenyl group, $-R^4OR^5$, $-R^4COR^5$ $-R^4COOR^5$ or

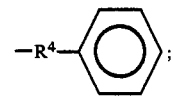

and $R^4$ and $R^5$ are as defined above.

According to a second embodiment of the present invention, the organic dye used in the invention is represented by a formula:

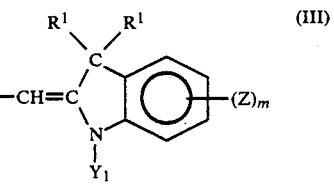

wherein $R^1$ and m are as defined above;
$R^2$ is a hydrogen atom, a halogen atom, an alkyl group having 1 to 6 carbon atoms,

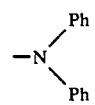

(wherein Ph is a phenyl group), or

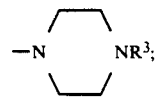

R3 is as defined above;
X is a perchlorate anion, a fluoroborate anion, an iodide anion, a chloride anion, a bromide anion, or a p-toluenesulfonate anion;
$Y^1$ is an alkyl group having 1 to 18 carbon atoms and preferably 1 to 10 carbon atoms, a phenyl group, $-R^4OH$, $-R^4COOH$, $-R^4OR^5$, $-R^4COR^5$, $-R^4COOR^5$,

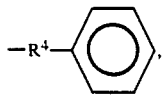

-continued

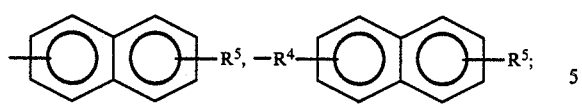

R⁴ and R⁵ are as defined above;

Z is a phenyl group, —OH, —COOH, —CN, —OCF₃, —OSF₃, —R⁸OH, —R⁸CHO, —R⁸COOH, —R⁸OR⁹, —R⁸COR⁹,

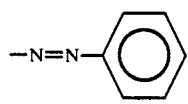

—R⁸CN, —OR⁹, —COR⁹ —NH₂N(R⁹)₂, —NH-COR⁹, or

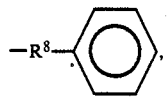

when m is 1 and is a phenyl group —OH, —COOH, —CN, —OCF₃, —OSF₃, —R⁸OH, —R⁸CHO, —R⁸COOH, —R⁸OR⁹, —R⁸COR⁹,

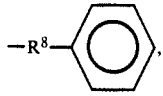

—R⁸CN, —OR⁹, —COR⁹, —NH₂N(R⁹)₂, —NH-COR⁹, or

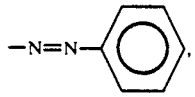

an alkyl group having 1 to 10 carbon atoms, or a halogen atom when m is 2; and

R⁸ and R⁹ are defined above.

According to a third embodiment of the present invention, the organic dye used in the present invention is represented by a formula:

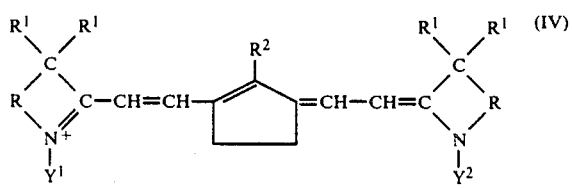

wherein R is 1,2-, 2,3-, or 3,4-naphthylene group;
R¹ is as defined above;
R² is a hydrogen atom, a halogen atom, an alkyl group having 1 to 6 carbon atoms,

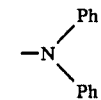

(wherein Ph is phenyl group), or

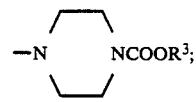

R³ is as defined above; and
Y¹ and Y² are as defined above.

According to a fourth embodiment of the present invention, the organic dye used in the present invention is represented by a formula:

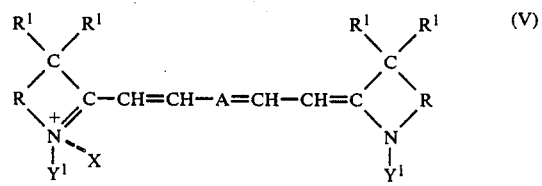

wherein
R is 1,2-, 2,3-, or 3,4-naphthylene group;
R¹ is as defined above;

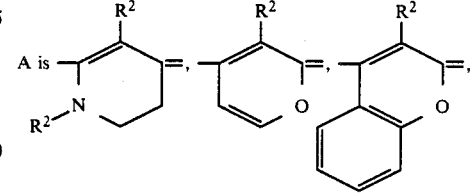

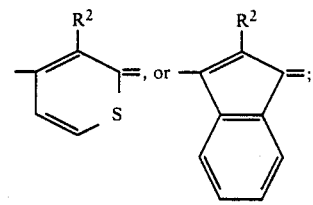

R² is a hydrogen atom, a halogen atom, an alkyl group having 1 to 6 carbon atoms,

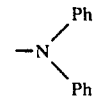

(wherein Ph is a phenyl group), or

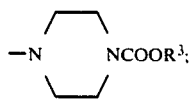

R³ is as defined above;

X is a perchlorate anion, a fluoroborate anion, an iodide anion, a chloride anion, a bromide anion, or a p-toluenesulforate anion; and $Y^1$ is an alkyl group having 1 to 18 carbon atoms and preferably 1 to 10 carbon atoms, a phenyl group, $-R^4OR^5$, $-R^4COR$, $-R^4COOR^5$, or

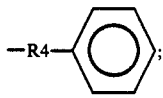

and $R^4$ and $R^5$ are a defined above.

According to a fifth embodiment of the present invention, the organic dye used in the present invention is represented by a formula:

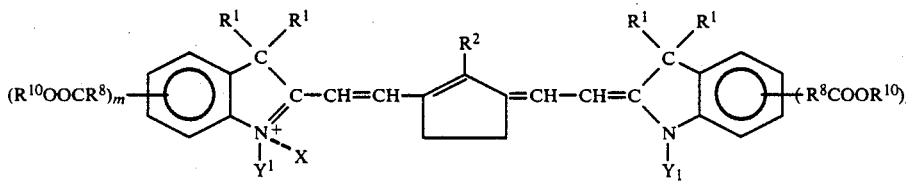

wherein $R^1$ and m are as defined above;

$R^2$ is a hydrogen atom, a halogen atom, an alkyl group having 1 to 6 carbon atoms, an allyl group, a diphenylamino group, a phenyl group, an aralkyl group, or

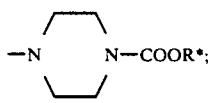

$R^*$ is as defined above;

X is a perchlorate anion, a fluoroborate anion, an iodide anion, a chloride anion, a bromide anion, or a p-toluenesulfonate anion;

$Y^1$ is an alkyl group having 1 to 20 carbon atoms and preferably 1 to 10 carbon atoms, $-R^8OH$, $-R^8\text{-}COOH$, $-CH(R^{**})Ph$ (wherein Ph is phenyl), $-R^8\text{-}COR^9$, $-R^8OR^9$, $-R^8CHO$, $-R^8COOR^9$,

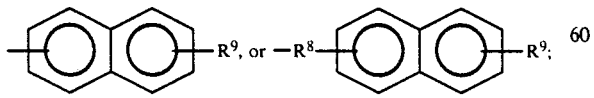

and $R^8$, $R^9$, $R^{10}$, and $R^{**}$ are as defined above.

The organic dye used in the present invention has the intervening cyclic group A in a methine chain and can form a recording layer having better durability, light resistance, weathering properties and resistance to read degradation than those of an organic dye (disclosed in Japanese Patent Disclosure (Kokai) No. 59-85791) having no such cyclic group in the methine chain and represented by the following general formula:

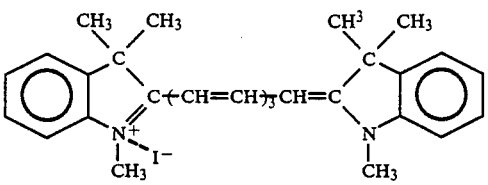

In formula (I), $R^2$ is preferably a chlorine atom, a bromine atom, or an alkyl group having 1 to 3 carbon atoms.

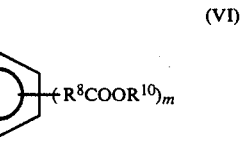

The organic dye according to the present invention has various advantages because it contains the R group. The organic dyes (general formulas (II), (IV) and (V)) each having a naphthylene group as the R group have a better hydrophobic property due to the presence of the naphthylene group than that of an organic dye (disclosed in Japanese Patent Disclosure (Kokai) Nos. 59-150795 and 58-194595) represented by the following general formula:

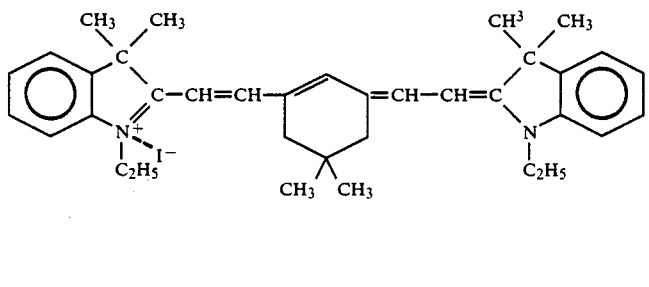

wherein the benzene ring constituting indole is unsubstituted or substituted with an alkyl group. Therefore, moisture resistance as one of the weathering properties can be improved. In addition, light resistance and fading resistance are also improved. As a result, resistance to read degradation can be improved.

Light resistance, chemical stability, and absorption peak of the organic dye (general formulas (III) and (VI)) having

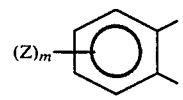

as the R group are improved. The solubility in solvents and film formation properties of this dye can be greatly improved as compared with a dye having an unsubstituted benzene ring or a benzene ring with a halogen atom. The substitution position of the Z group in the benzene ring is preferably a 5-position for easier substitution but may be 4-, 6-, or 7-position.

In the dye represented by general formula (III), an electron attractive group such as —CN, —OCF₃, or —(Cl)₂ is preferably used to improve optical/chemical stability. In order to improve solubility in solvents and film formation properties, —(R⁹)₂,

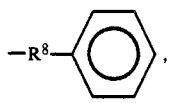

or —R⁸COOH is preferably added as the Z group.

In the dye represented by general formula (II) and having an alkyl or aralkyl group as the Y¹ group, moisture and heat resistances are improved. In the dye represented by general formula (II) and having —R⁴COR⁵, —R⁴OR⁵, or —R⁴COOR⁵ group as the Y¹ group, solubility in solvents and film formation properties are improved.

In the dye represented by general formula (III) and having an alkyl group,

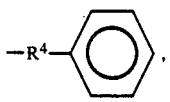

—R⁴OR⁵ or the like as the Y¹ group, thermal and chemical stabilities are improved. In the dye represented by general formula (III) and having —R⁴COOH, —R⁴COR⁵, —R⁴COOR⁵, —R⁴OR⁵ or the like as the Y¹ group, the film formation properties and solubility in solvents are improved.

The dye represented by general formula (IV) has a sulfoalkyl group as the Y¹ group, and chemical stability, solubility in solvents, and wettability for the substrate are improved.

In the dye represented by general formula (V) and having an alkyl or aralkyl group as the Y¹ group, moisture and heat resistances are improved. In the dye represented by general formula (V) and having —R⁴COR⁵, —R⁴OR⁵, or —R⁴COOR⁵ as the Y¹ group, solubility in solvents and film formation properties are improved.

In the dye represented by general formula (VI) and having

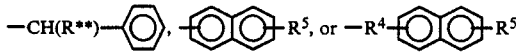

as the Y¹ group, moisture and heat resistances are improved. In the dye represented by general formula (VI) and having —R⁴OH, —R⁴COOH, —R⁴COR⁵, —R⁴COOR⁵, or —R⁴CHO, solubility n solvents and film formation properties are improved.

Optical stability, chemical stability, solubility in solvents, and film formation properties of the organic dye according to the present invention are improved as compared with those of the conventional dyes. When the organic dye according to the present invention is used to form a recording layer, an optical information recording medium is prepared wherein noise components in the reproduced signal waveform, which are caused by incomplete film formation can be reduced and weathering properties and the read degradation characteristics are improved. The dye used in the invention can be prepared by a method described in Japanese Patent Disclosure (Kokai) 57-157254 (corresponding to U.S. patent application Ser. No. 237067 filed on Feb. 23, 1981), with or without modification.

Examples of the dye represented by general formula (II) are represented by structural formulas (1) to (13) below:

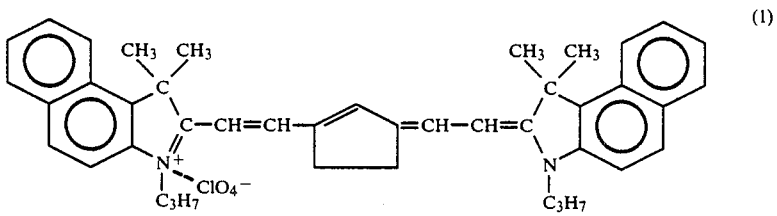

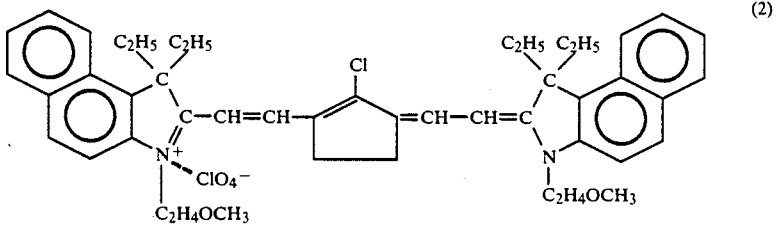

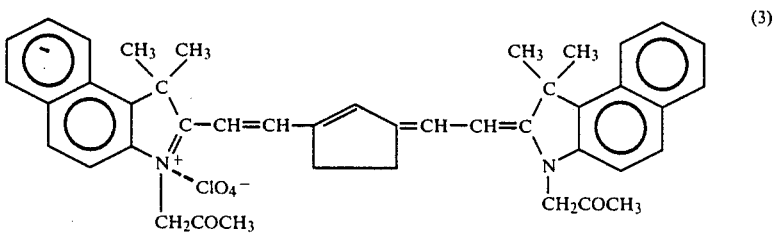

-continued
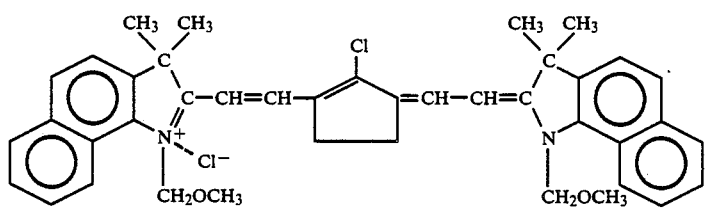 (4)
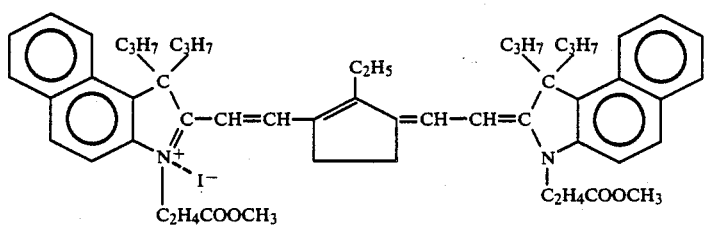 (5)
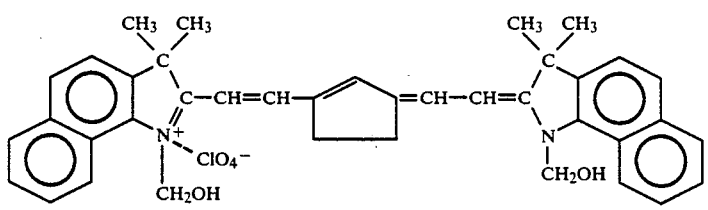 (6)
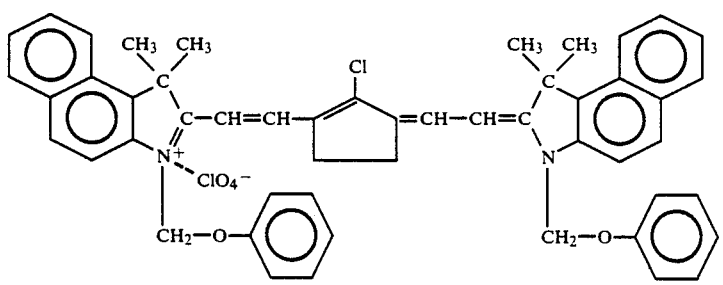 (7)
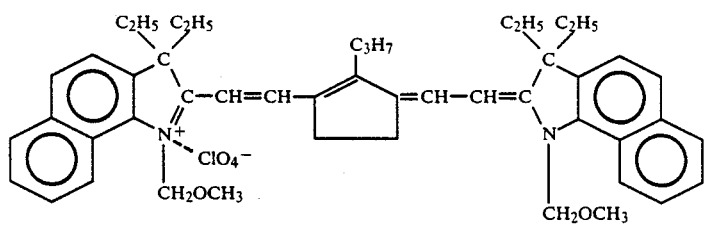 (8)
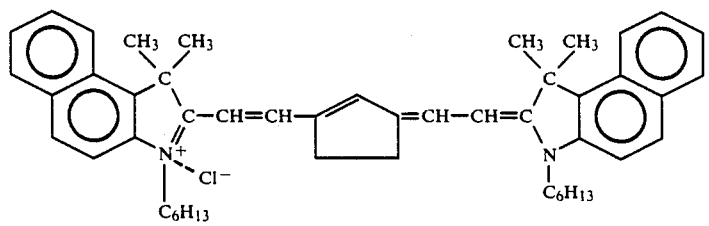 (9)

-continued
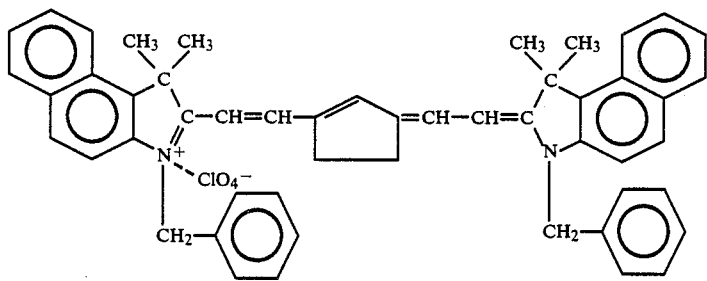 (10)
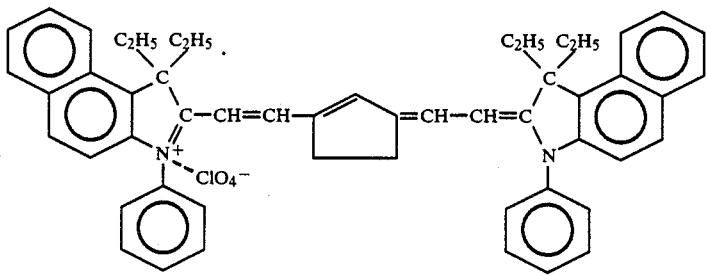 (11)
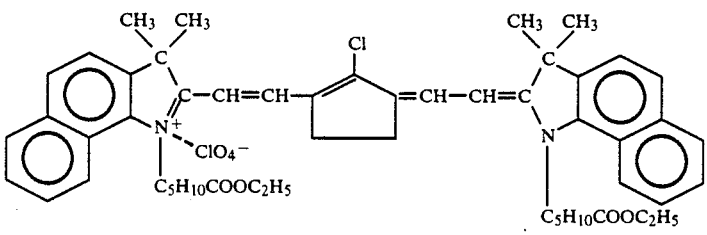 (12)
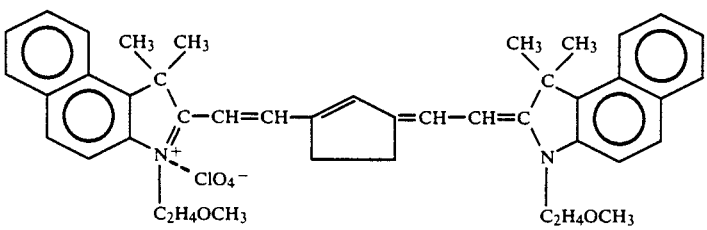 (13)
Examples of the dye represented by general formula (III) are represented by structural formulas (14) to (31):
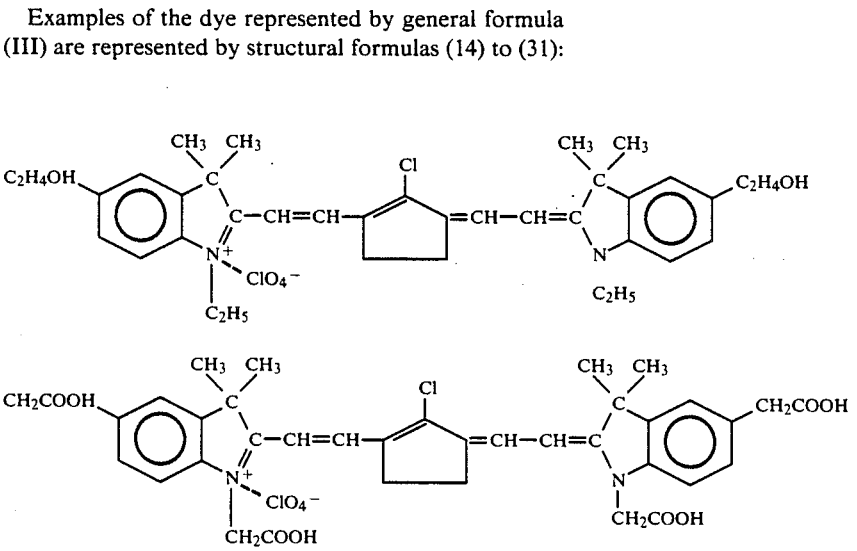

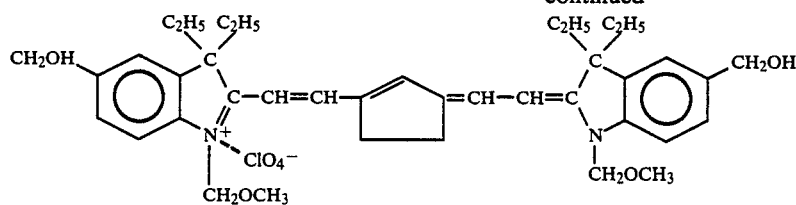
(16)
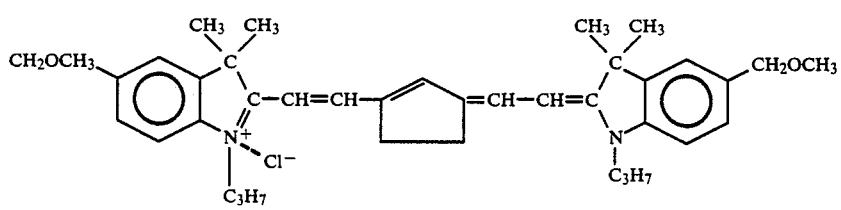
(17)
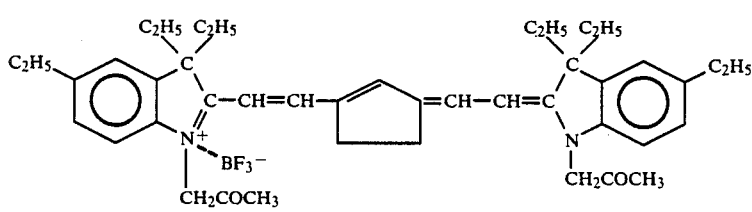
(18)
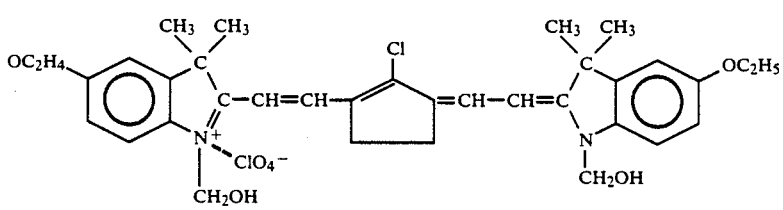
(19)
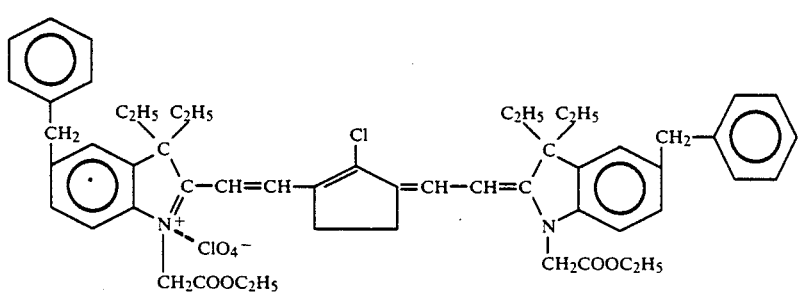
(20)
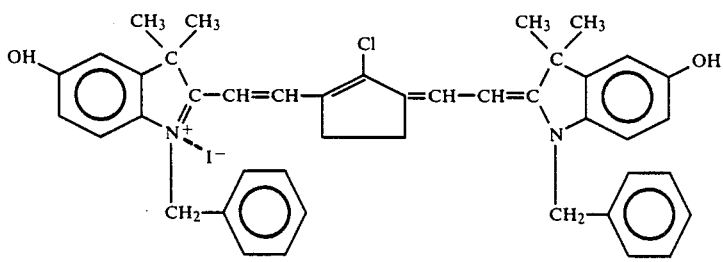
(21)
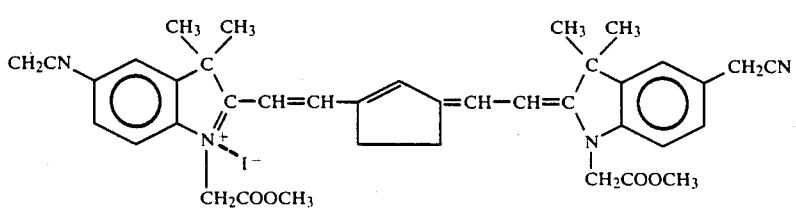
(22)

-continued
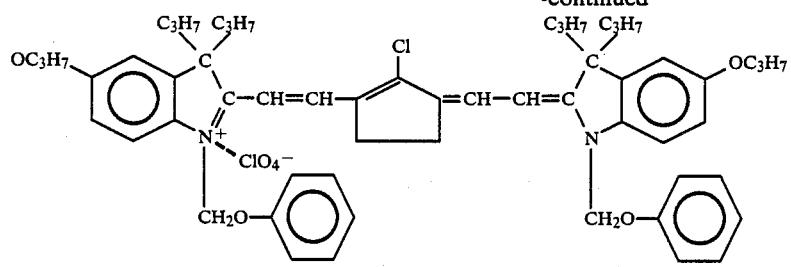
(23)
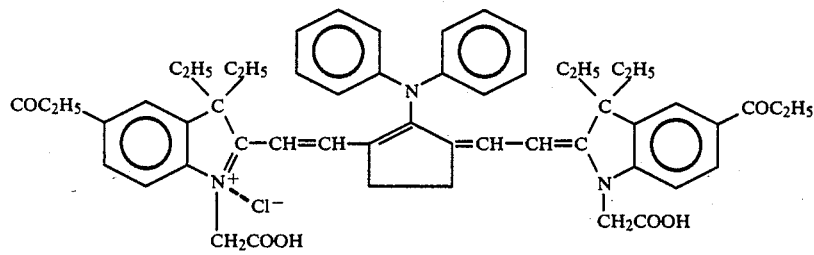
(24)
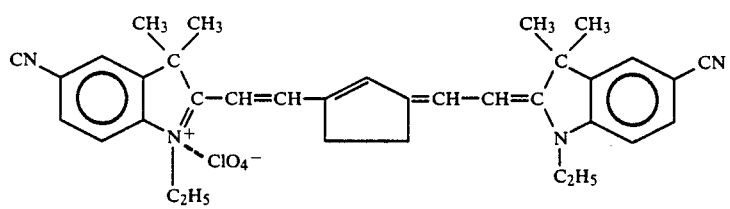
(25)
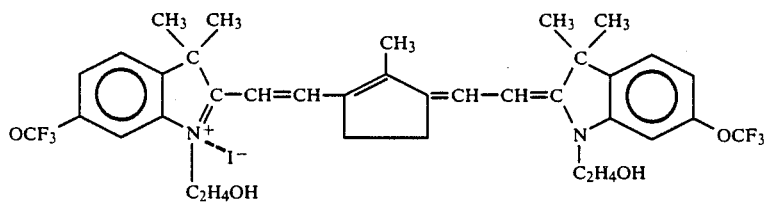
(26)
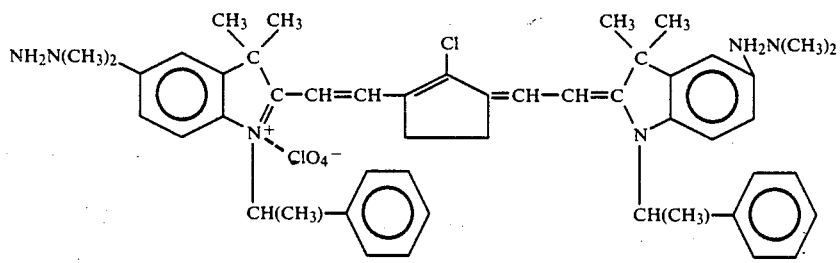
(27)
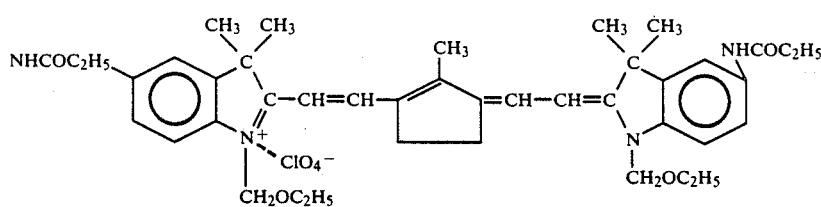
(28)
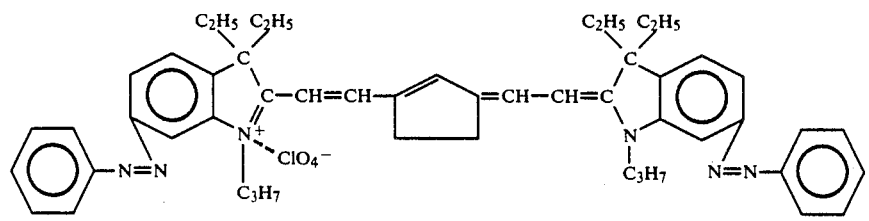
(29)

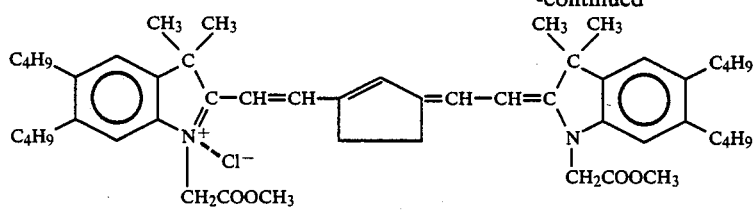
(30)
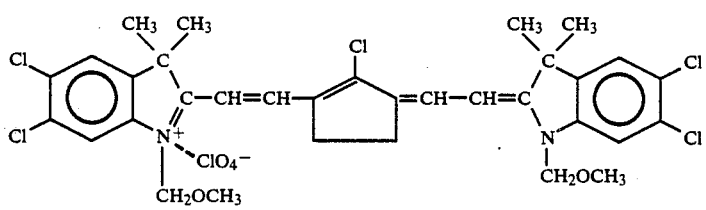
(31)
Examples of the dye represented by general formula (IV) are represented by structural formulas (32) to (36):
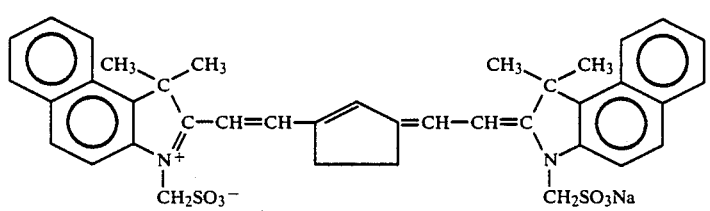
(32)
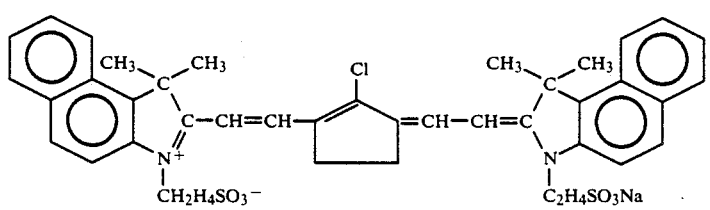
(33)
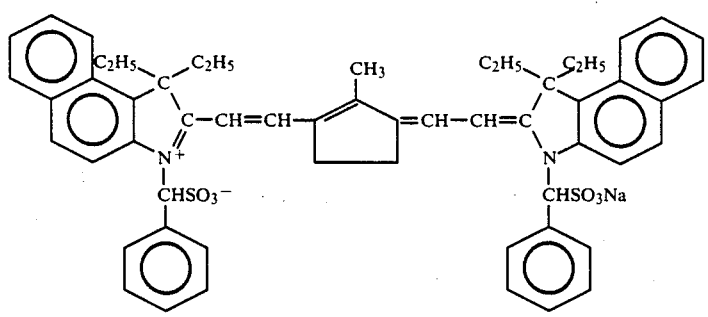
(34)
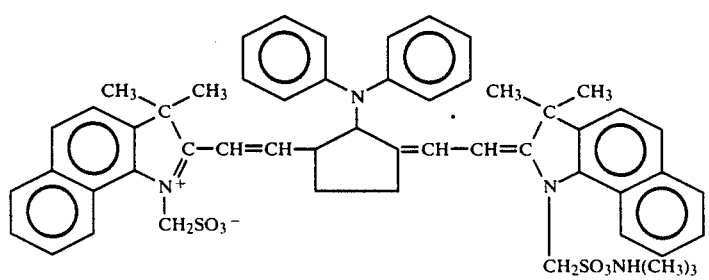
(35)

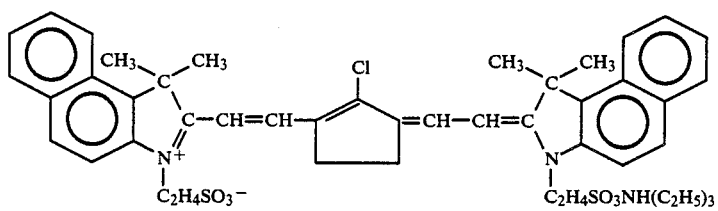
(36)
Examples of the dye represented by general formula (V) are represented by structural formulas (37) to (50):
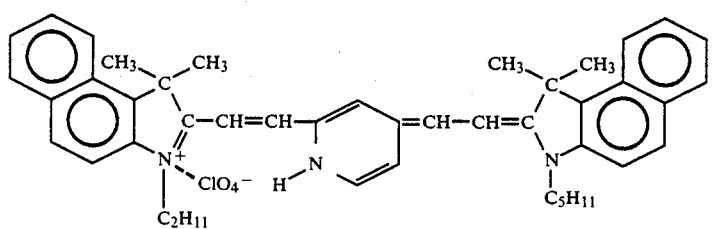
(37)
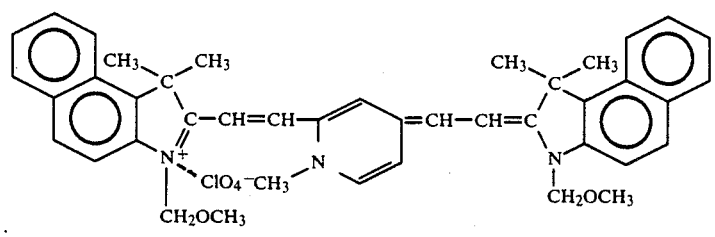
(38)
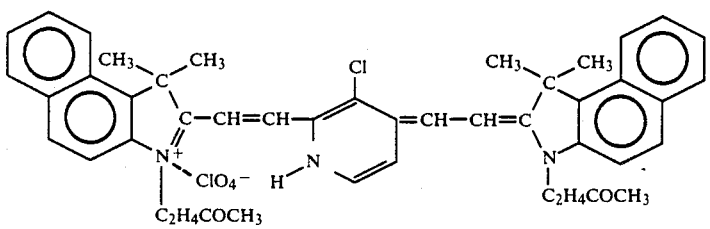
(39)
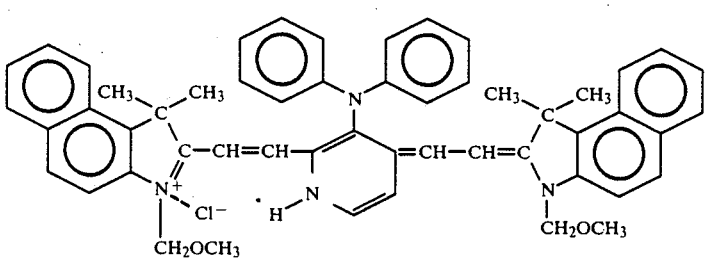
(40)
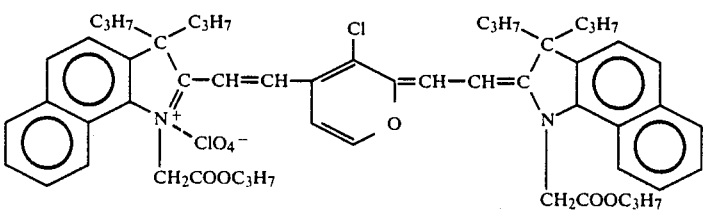
(41)

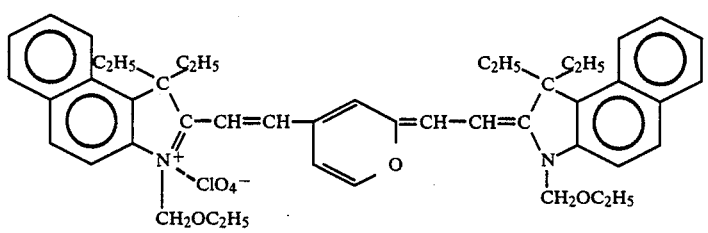
(42)
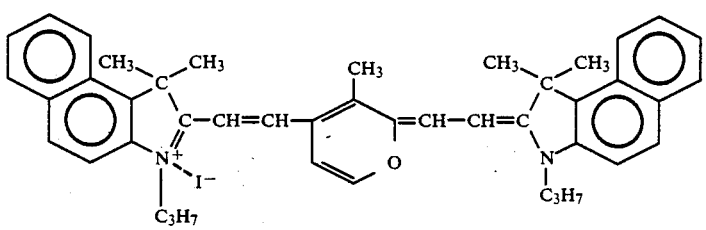
(43)
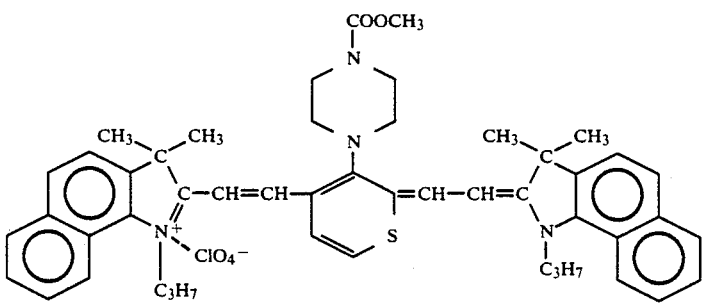
(44)
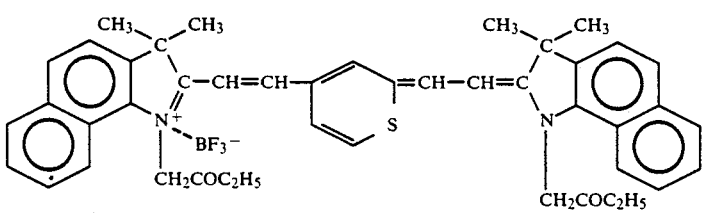
(45)
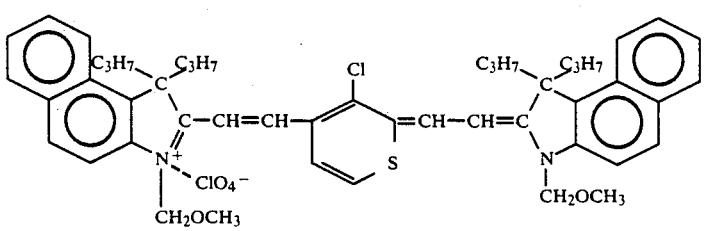
(46)
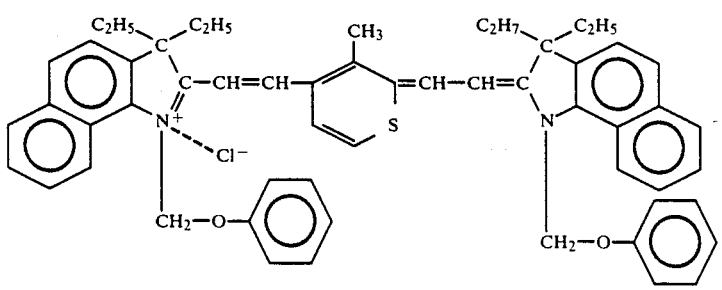
(47)

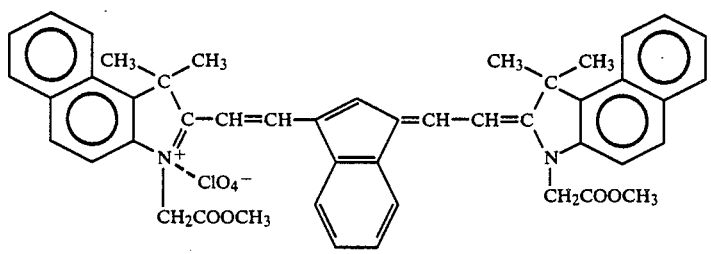
(48)
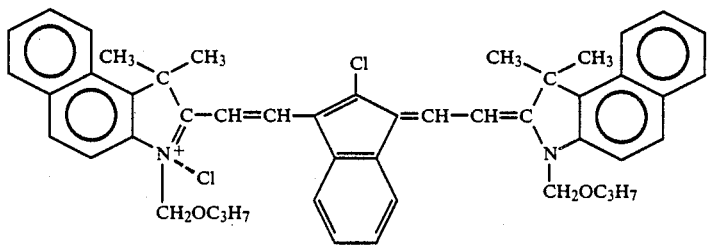
(49)
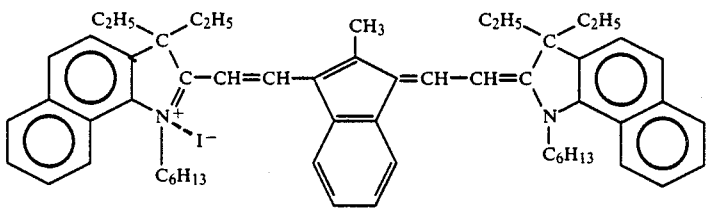
(50)
Examples of the dye represented by general formula (VI) are represented by structural formulas (51) to (65):
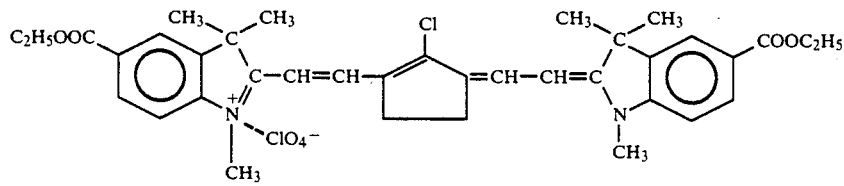
(51)
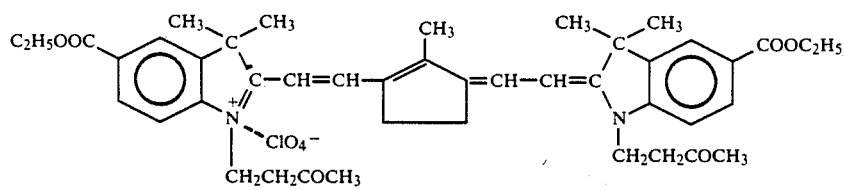
(52)
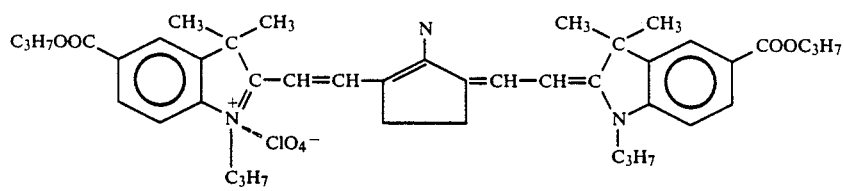
(53)
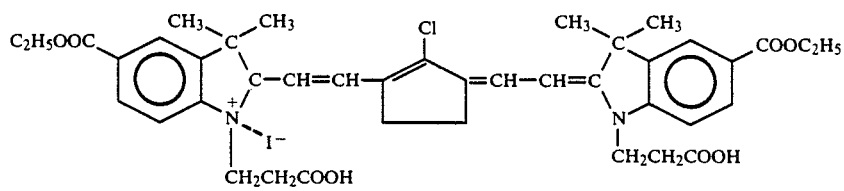
(54)

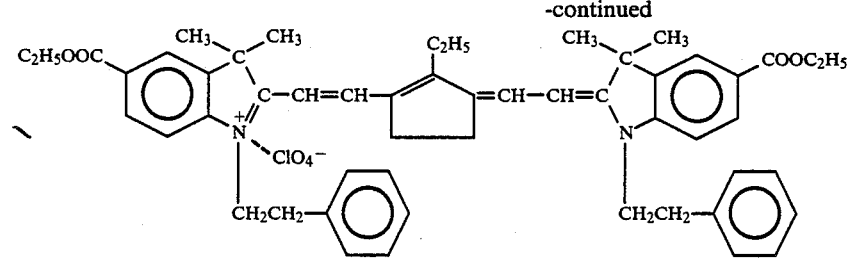
(55)
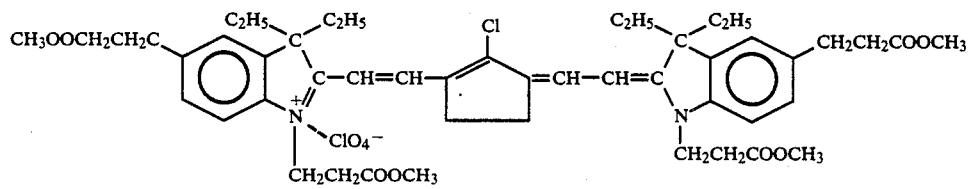
(56)
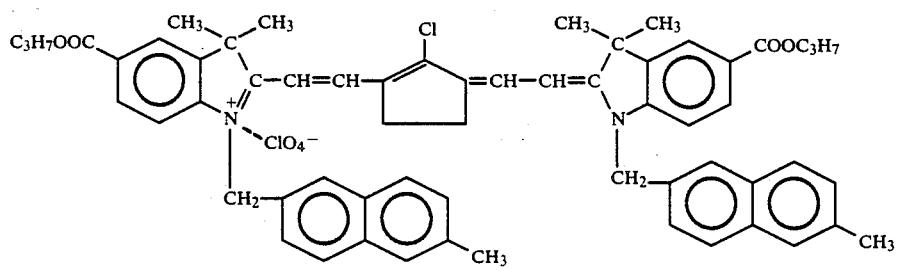
(57)
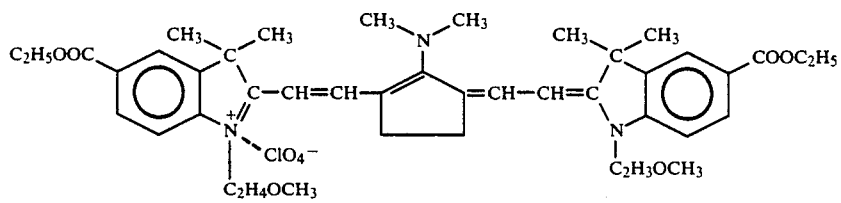
(58)
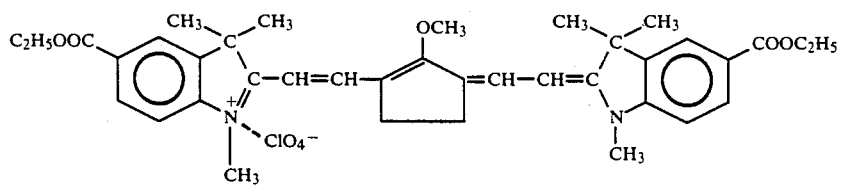
(59)
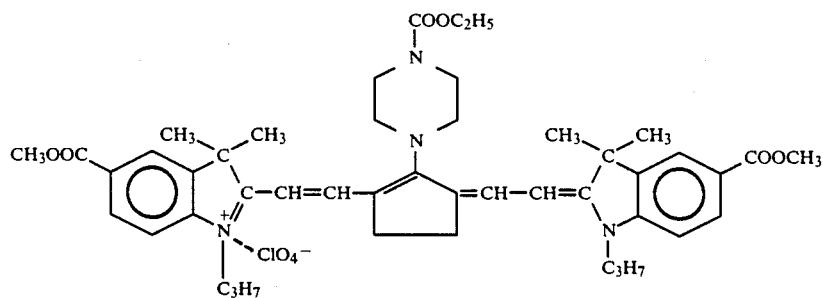
(60)
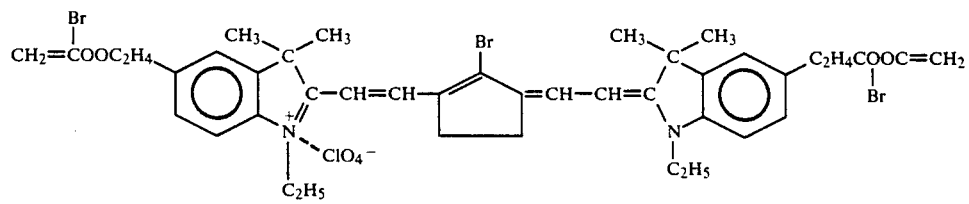
(61)

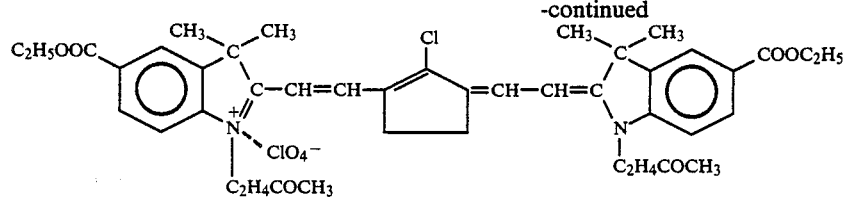 (62)

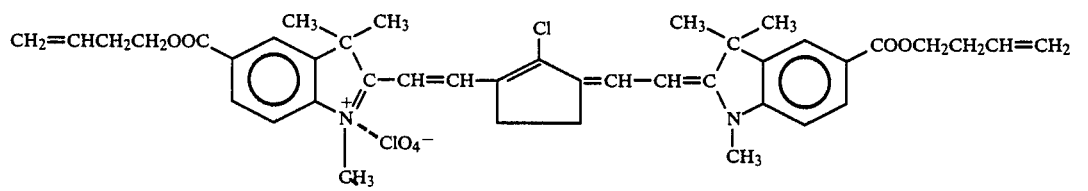 (63)

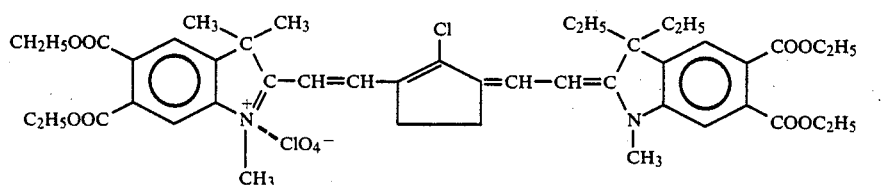 (64)

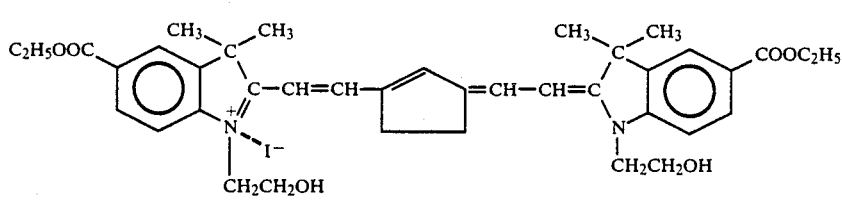 (65)

The recording layers containing dyes according to the present invention are prepared as thin films on corresponding substrates by a spinner method, a dipping method, a doctor blade method, or a roll coater method after the dyes are dissolved in solvents such as ethyl acetate, toluene, acetone, methyl ethyl ketone, methyl isobutyl ketone, methylene chloride, chloroform, dichloroethane, tetrahydrofuran, and alcohol. Recording sensitivity is increased when the thickness of the recording layer is decreased. However, the reflectance of the layer depends on its thickness. It is desirable that the thickness of the recording layer fall within the range of 10 nm to 1,000 nm and, preferably 30 nm to 500 nm.

The substrate comprises: a plastic sheet or plate made of polyester, acrylic resin, polycarbonate resin, polyolefin resin, phenol resin, epoxy resin, polyamide resin, or polyimide resin; a glass plate; or a metal plate.

The recording layer is formed by the method described above. 1 to 40% by weight and, preferably 3 to 20% by weight of a binder resin may be added to the dye to improve film formation properties, heat resistance, and moisture resistance. Examples of the binder resin are acrylic resin, ester resin, nitrocellulose, polyethylene, polypropylene, polycarbonate, polyethylene terephthalate, polyurethane resin, epoxy resin, butyral, polyvinyl chloride, polyvinyl acetate, polystyrene, a copolymer thereof, and a mixture thereof.

Instead of using the binder resin as described above, other dyes may be added to a given dye of the present invention, or dye layers are laminated to constitute a multilayer structure, thereby improving film formation properties, heat resistance, moisture resistance, and light resistance. Therefore, an excellent optical information recording medium having a high recording density, high sensitivity, and long-term durability and being free from read degradation can be prepared. Other dye layer or layers may be stacked on the dye layer of the present invention to improve heat resistance, moisture resistance and optical resistance. Examples of the dye used together with the dye of the present invention are a cyanine dye, a merocyanine dye, an anthraquinone dye, a triphenylmethane dye, a xanthene dye, and a thalocyanine dye. In particular, the dye which may be used together with the dye of the present invention is preferably a naphthalocyanine compound represented by general formula (I) described in U.S. patent application Ser. No. 879,470 filed on June 27, 1986, entitled "OPTICAL INFORMATION RECORDING MEDIUM". The disclosure of the U.S. Patent Application is incorporated herein by reference.

Amine compounds represented by general formulas (A) and (B) and a dithiorate metal complex represented by general formula (C) may be added to the dye of the present invention to prevent the recording layer from degrading in optical characteristics which is caused by light, oxygen or moisture:

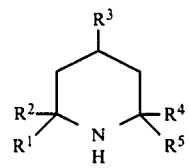 (A)

wherein each of $R^1$, $R^2$, $R^4$, and $R^5$ is independently an alkyl group having 1 to 6 carbon atoms, $R^3$ is

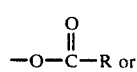 or

-continued

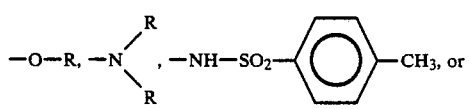

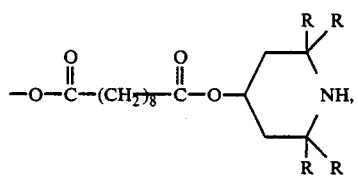

and R is an alkyl group having 1 to 6 carbon atoms. The compound represented by general formula (A) serves as a doublet oxygen quencher.

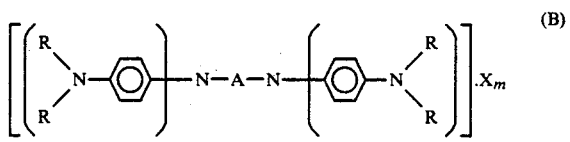

wherein R is a hydrogen atom or an alkyl group having 1 to 6 atoms, X is a perchlorate anion, a fluoroborate anion, or a hexafluorate anion, m is an integer of 0, 1, or 2, A is

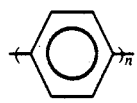

(wherein n is 1 or 2) when m=0 or 1 and

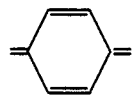

when m=2. Examples of such an amine compound are IRG-002 and IRG-003 (tradenames) commercially available from NIPPON KAYAKU CO., LTD. The compound represented by general formula (B) serves as an infrared ray absorber.

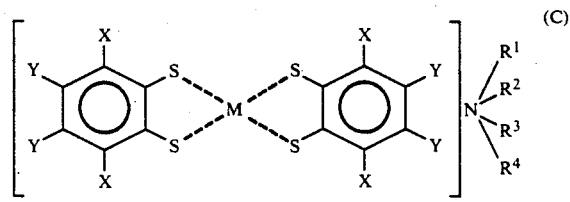

wherein each of $R^1$ to $R^4$ is independently an alkyl or phenyl group, each of X and Y is independently a hydrogen atom, an alkyl group, or a halogen group, and M is a metal such as Ni, Co, Fe, or Cr. Examples of the metal complex are PA1001 to PA1006(tradenames) commercially available from Mitsui Toatsu Fine K.K., Ni-bis(o-xylene-4,5-diole)tetra(t-butyl)ammonium salt, and the like. The compound represented by genera formula (C) serves as a doublet oxygen quencher.

An interlayer and a protective layer may be formed in the information recording medium, in addition to the recording layer containing a dye of the present invention. The interlayer improves an adhesion property of the recording layer with a substrate and protects the recording layer from oxygen and moisture. The interlayer can be made of a resin or an inorganic compound. Examples of the resin are polymers and copolymers of vinyl chloride, vinyl acetate, acryl, ester, nitrocellulose, carbonate, epoxy, ethylene, propylene, and butyral. An antioxide, an ultraviolet absorber, a levelling agent, a water repellent, or the like may be contained in the resin. The resin may be applied to the substrate by spinner coating or dipping, or using a doctor blade. Examples of the inorganic compound are $SiO_2$, SiO, $Al_2O_3$, $SnO_2$, and $MgF_2$. The inorganic compound film can be formed by an ion beam method, an electron beam method, or a sputtering method. The protective layer may be formed in the same manner as the interlayer. The protective layer aims at protecting the recording layer from light, oxygen, moisture, and dust and at preventing the layer from damage.

Structures of the optical information recording media according to the present invention will be described with reference to the accompanying drawings.

FIG. 1 shows a basic structure of the optical information recording medium. Recording layer 2 containing a dye of the present invention is formed on substrate 1. Laser beam 3 is focused by a focusing lens to form a laser spot having a diameter of 0.8 to 1.5 μm on layer 2 to write information in layer 2 or read it therefrom. Laser beam 3 may be incident from the side of layer 2. However, if substrate 1 is transparent, the beam is preferably incident from the side of substrate so that influences of contamination and dust on recording layer 2 can be minimized.

Figure 2:
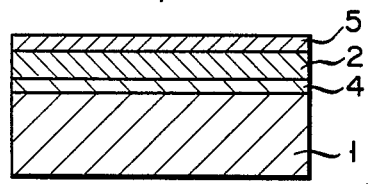

FIG. 2 shows a structure wherein interlayer 4 is formed between substrate 1 and recording layer 2, and protective layer 5 is formed on layer 2.

Figure 3:
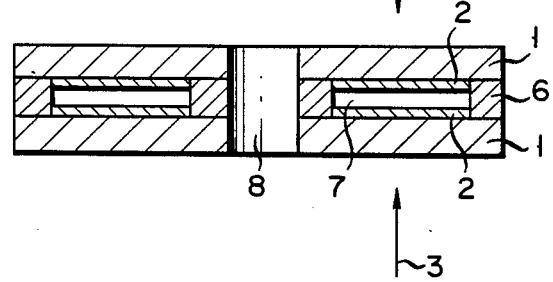

FIG. 3 shows a structure wherein two media having an identical constitution are bonded through spacer 6 such that recording layers 2 thereof oppose each other. Reference numeral 7 in FIG. 3 denotes an air gap; and 8, a spindle hole. With the above structure, good optical characteristics can be obtained, and the contamination and dust of recording layers 2 can be eliminated.

In the structures in FIGS. 1 to 3, an Al or Ag film or any other reflecting film may be formed between the substrate and the recording layer.

EXAMPLE 1

A dye represented by formula (2) was dissolved in methyl ethyl ketone to prepare a 2% solution. The solution was applied to a 1.2-mm thick glass substrate by a spin coater. The dye layer was dried to prepare a 75-nm thick recording layer, thereby obtaining a recording medium.

EXAMPLE 2

A dye represented by formula (4) was dissolved in methyl ethyl ketone to prepare a 2% solution. The solution was applied to a 1.2-mm thick glass substrate by a spin coater. The dye layer was dried to prepare a 70-nm thick recording layer, thereby obtaining a recording medium.

EXAMPLE 3

A dye represented by formula (5) was dissolved in methylene chloride to prepare a 2% solution. The solution was applied to a 1.2-mm thick glass substrate by a spin coater. The dye layer was dried to prepare a 70-nm thick recording layer, thereby obtaining a recording medium.

EXAMPLE 4

A dye represented by formula (7) was dissolved in methylene chloride to prepare a 2% solution. The solution was applied to a 1.3-mm thick glass substrate by a spin coater. The dye layer was dried to prepare a 75-nm thick recording layer, thereby obtaining a recording medium.

EXAMPLE 5

10% by weight of acrylic resin (Dianal BR-60: tradename available from Mitsubishi Rayon Co., Ltd.) as a binder resin was added to a dye represented by formula (10), and the mixture was dissolved in methyl ethyl ketone to prepare a 3% solution. The solution was applied to a 1.2-mm thick glass substrate by a spin coater. The dye layer was dried to prepare a 90-nm thick recording layer, thereby obtaining a recording medium.

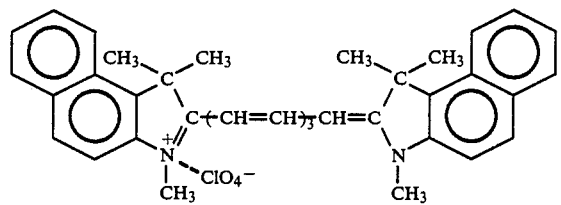
(a)

EXAMPLE 8

Following the same procedures as in Example 1, a dye represented by formula (3) was applied to a glass substrate to form a 60-nm thick recording layer. Aluminum naphthalocyanine represented by formula (b) below was heated and vacuum-deposited on the recording layer at a vacuum of $1.0 \times 10^{-5}$ Torr to form a 30-nm thick reflecting protective layer on the recording layer, thereby preparing a recording medium.

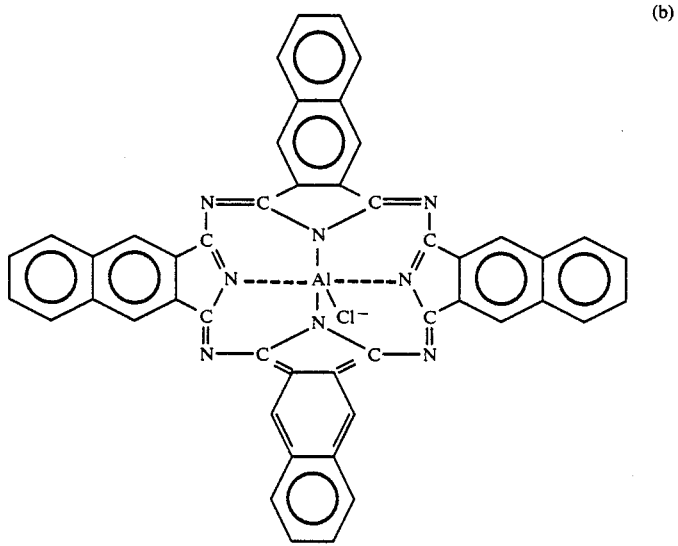
(b)

EXAMPLE 6

A dye represented by formula (13) was mixed with an infrared absorber (IRG-003: tradename available from NIPPON KAYAKU CO., LTD.) at a weight ratio of 3 : 1, and the mixture was dissolved in methyl ethyl ketone to prepare a 2% solution. The solution was applied to a 1.2-mm thick glass substrate by a spin coater. The dye layer was dried to prepare a 75-nm thick recording layer, thereby obtaining a recording medium.

EXAMPLE 7

A dye represented by formula (12) was mixed with a dye represented by formula (a) below at a weight ratio of 2 : 1, and the mixture was dissolved following the same procedures as in Example 1. The solution was applied on a substrate as in Example 1 and dried to form a 70-nm thick recording layer, thereby obtaining a recording medium.

COMPARATIVE EXAMPLE 1

A dye represented by the following formula (i) was dissolved in methylene chloride to prepare a 2% solution. The solution was applied to a 1.2-mm thick glass substrate by a spin coater. The dye layer was dried to prepare a 70-nm thick recording layer, thereby obtaining a recording medium.

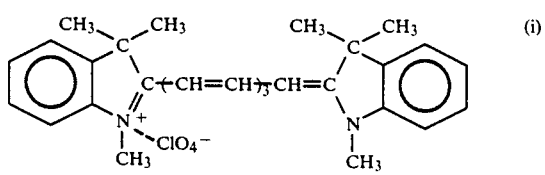
(i)

COMPARATIVE EXAMPLE 2

Following the same procedures as in Comparative Example 1, a dye represented by the following formula (ii) was dissolved, and the resultant solution was applied to a glass substrate and was then dried to prepare a 70-nm thick recording layer, thereby obtaining a recording medium.

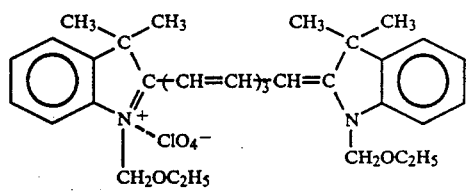

(ii)

COMPARATIVE EXAMPLE 3

Following the same procedures as in Comparative Example 1, a dye represented by the following formula (iii) was dissolved, and the resultant solution was applied to a glass substrate and was then dried to prepare a 70-nm thick recording layer, thereby obtaining a recording medium.

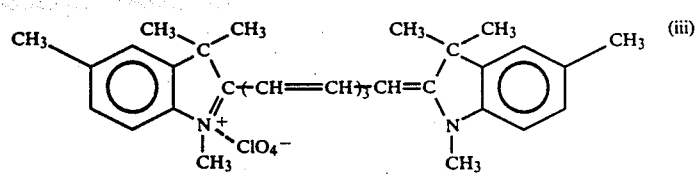

(iii)

COMPARATIVE EXAMPLE 4

Following the same procedures as in Comparative Example 1, a dye represented by the following formula (iv) was dissolved, and the resultant solution was applied to a glass substrate and was then dried to prepare a 70-nm thick recording layer, thereby obtaining a recording medium.

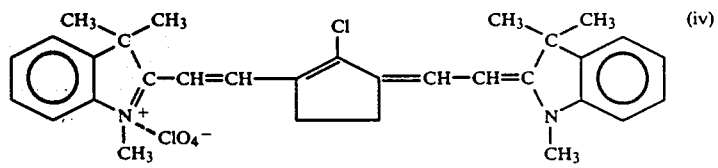

(iv)

Reflectances of the recording layers of the recording media prepared in Examples 1 to 8 and Comparative Examples 1 to 4 were measured by a spectroscope when light having a wavelength of 830 nm was incident from the sides of the recording layers. Absorbances of these recording layers were also measured when light having a wavelength of 830 nm was incident thereonto. A semiconductor laser beam having a wavelength of 830 nm was focused to form a 1.2μm diameter spot such that an output thereof on the surface of the medium was 7 mW. The laser spot was scanned at a rate of 9 m/sec from the side of the substrate of each recording medium so as to write a 1-MHz signal. The laser spot having an output power of 0.4 mW was used to read the signal so as to measure recording sensitivity (i.e., a recording energy threshold value) and a C/N value of the readout signal. The recording media prepared in Examples 1 to 8 and Comparative Examples 1 to 4 were exposed in an atmosphere at a temperature of 50° C. and a humidity of 95% for 150 hours. The rates of decreases in absorbances and reflectances of the recording media before and after the heat and moisture resistance test were measured. The light resistance test was made such that a 500-W tungsten beam was incident on each recording medium from a position away from the surface by 50 cm in an atmosphere having a temperature of 25° C. and a humidity of 60% for 100 hours. The rates of changes in absorbances and reflectances before and after radiation of the tungsten beam were measured. These results are summarized in Table 1 below.

TABLE 1

| | Organic Dye | Initial Spectral Characteristics (Wavelength of 830 nm) | | Recording Sensitivity (mJ/spot) | C/N Value (dB) | Film Formation Properties | Heat and Moisture Resistance Test | | Light Resistance Test | |
|---|---|---|---|---|---|---|---|---|---|---|
| | | Absorbance | Reflectance (%) | | | | Rate of Decrease in Absorbance | Rate of Decrease in Reflectance | Rate of Decrease in Absorbance | Rate of Decrease in Reflectance |
| Example 1 | Formula (2) | 1.6 | 32 | 2.9 | 56 | ◎ | 6 | 7 | 6 | 7 |
| Example 2 | Formula (4) | 1.6 | 33 | 3.0 | 55 | ◎ | 6 | 5 | 7 | 5 |
| Example 3 | Formula (5) | 1.5 | 30 | 3.0 | 55 | ◎ | 4 | 6 | 6 | 5 |
| Example 4 | Formula (7) | 1.4 | 30 | 2.9 | 55 | ◎ | 5 | 5 | 5 | 5 |
| Example 5 | Formula (10) | 1.3 | 25 | 3.4 | 54 | ◎ | 4 | 3 | 5 | 6 |
| Example 6 | Formula (13) | 1.4 | 31 | 3.1 | 55 | ◎ | 5 | 6 | 4 | 5 |
| Example 7 | Formula (12) + Formula (a) | 1.5 | 33 | 2.8 | 56 | ◎ | 5 | 6 | 5 | 5 |
| Example 8 | Formula (3) + Formula (b) | 1.6 | 35 | 2.9 | 56 | ◎ | 4 | 3 | 3 | 3 |
| Comparative Example 1 | Formula (i) | 0.9 | 45 | 2.9 | 50 | O | 22 | 19 | 31 | 25 |
| Comparative | Formula (ii) | 0.9 | 35 | 3.1 | 50 | ◎ | 24 | 20 | 28 | 25 |

TABLE 1-continued

|  | Organic Dye | Initial Spectral Characteristics (Wavelength of 830 nm) | | Recording Sensitivity (mJ/spot) | C/N Value (dB) | Film Formation Properties | Heat and Moisture Resistance Test | | Light Resistance Test | |
|---|---|---|---|---|---|---|---|---|---|---|
|  |  | Absorbance | Reflectance (%) |  |  |  | Rate of Decrease in Absorbance | Rate of Decrease in Reflectance | Rate of Decrease in Absorbance | Rate of Decrease in Reflectance |
| Example 2 Comparative Example 3 | Formula (iii) | 1.1 | 39 | 2.9 | 52 | ○ | 19 | 17 | 23 | 25 |
| Comparative Example 4 | Formula (iv) | 1.6 | 32 | 2.4 | 52 | △ | 9 | 8 | 8 | 10 |

EXAMPLE 9

A dye represented by formula (14) was dissolved in methyl ethyl ketone to prepare a 2% solution. The solution was applied to a 1.2-mm thick glass substrate by a spin coater. The dye layer was dried to prepare a 70-nm thick recording layer, thereby obtaining a recording medium.

EXAMPLE 10

A dye represented by formula (16) was dissolved in methyl ethyl ketone to prepare a 2% solution. The solution was applied to a 1.2-mm thick glass substrate by a spin coater. The dye layer was dried to prepare a 75-nm thick recording layer, thereby obtaining a recording medium.

EXAMPLE 11

15% by weight of acrylic resin (Dianal BR-60: tradename available from Mitsubishi Rayon Co., Ltd.) as a binder resin was added to a dye represented by formula (19), and the mixture was dissolved in methylene chloride to prepare a 2.5% solution. The solution was applied to a 1.2-mm thick glass substrate by a spin coater. The dye layer was dried to prepare a 90-nm thick recording layer, thereby obtaining a recording medium.

EXAMPLE 12

A dye represented by formula (25) was mixed with an infrared absorber (IRG-003: tradename available from NIPPON KAYAKU CO., LTD.) at a weight ratio of 3 : 1, and the mixture was dissolved in methyl ethyl ketone to prepare a 2% solution. The solution was applied to a 1.2-mm thick glass substrate by a spin coater. The dye layer wa dried to prepare a 70-nm thick recording layer, thereby obtaining a recording medium.

EXAMPLE 13

A dye represented by formula (31) was mixed with a dye represented by formula (a) used in Example 7 at a weight ratio of 2 : 1, and the mixture was dissolved following the same procedures as in Example 1. The solution was applied and dried to form a 75-nm thick recording layer, thereby obtaining a recording medium.

EXAMPLE 14

Following the same procedures as in Example 9, dye represented by formula (14) was applied to a glass substrate to form a 60-nm thick recording layer. Aluminum naphthalocyanine represented by formula (b) used in Example 8 was heated and vacuum-deposited on the recording layer at a vacuum of $1.0 \times 10^{-5}$ Torr to form a 25-nm thick reflecting protective layer on the recording layer, thereby preparing a recording medium.

COMPARATIVE EXAMPLE 5

Following the same procedures as in Comparative Example 1, a dye represented by the following formula (v) was dissolved, and the resultant solution was applied to a glass substrate and was then dried to prepare a 70-nm thick recording layer, thereby obtaining a recording medium.

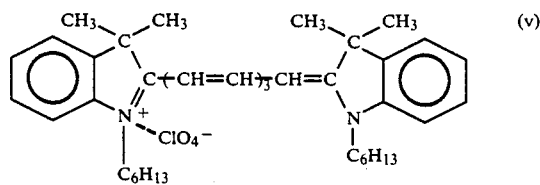

The tests as described above were performed for the recording media prepared in Examples 9 to 14 and Comparative Example 5. Results are summarized in Table 2 below.

TABLE 2

|  | Organic Dye | Initial Spectral Characteristics (Wavelength of 830 nm) | | Recording Sensitivity (mJ/spot) | C/N Value (dB) | Film Formation Properties | Heat and Moisture Resistance Test | | Light Resistance Test | |
|---|---|---|---|---|---|---|---|---|---|---|
|  |  | Absorbance | Reflectance (%) |  |  |  | Rate of Decrease in Absorbance | Rate of Decrease in Reflectance | Rate of Decrease in Absorbance | Rate of Decrease in Reflectance |
| Example 9 | Formula (14) | 1.6 | 81 | 2.9 | 56 | ◎ | 6 | 5 | 7 | 5 |
| Example 10 | Formula (16) | 1.5 | 33 | 2.8 | 55 | ◎ | 6 | 7 | 6 | 5 |
| Example 11 | Formula (19) | 1.6 | 24 | 3.3 | 53 | ◎ | 3 | 3 | 3 | 4 |
| Example 12 | Formula (25) | 1.6 | 29 | 2.9 | 54 | ◎ | 7 | 5 | 5 | 4 |
| Example 13 | Formula (31) + | 1.5 | 32 | 3.0 | 54 | ◎ | 6 | 6 | 3 | 4 |

TABLE 2-continued

| | Organic Dye | Initial Spectral Characteristics (Wavelength of 830 nm) | | Recording Sensitivity (mJ/spot) | C/N Value (dB) | Film Formation Properties | Heat and Moisture Resistance Test | | Light Resistance Test | |
|---|---|---|---|---|---|---|---|---|---|---|
| | | Absorbance | Reflectance (%) | | | | Rate of Decrease in Absorbance | Rate of Decrease in Reflectance | Rate of Decrease in Absorbance | Rate of Decrease in Reflectance |
| Example 14 | Formula (a) Formula (14) + Formula (b) | 1.4 | 36 | 2.6 | 56 | ⊚ | 3 | 3 | 3 | 2 |
| Comparative Example 5 | Formula (v) | 1.1 | 35 | 3.0 | 52 | ○ | 19 | 17 | 30 | 25 |

EXAMPLE 15

A dye represented by formula (32) was dissolved in methyl ethyl ketone to prepare a 2% solution. The solution was applied to a 1.2-mm thick glass substrate by a spin coater. The dye layer was dried to prepare a 70-nm thick recording layer, thereby obtaining a recording medium.

EXAMPLE 16

A dye represented by formula (33) was dissolved in methylene chloride to prepare a 2% solution. The solution was applied to a 1.2-mm thick glass substrate by a spin coater. The dye layer was dried to prepare a 80-nm thick recording layer, thereby obtaining a recording medium.

EXAMPLE 17

A dye represented by formula (34) was dissolved in methylene chloride to prepare a 2% solution. The solution was applied to a 1.2-mm thick glass substrate by a spin coater. The dye layer was dried to prepare a 70-nm thick recording layer, thereby obtaining a recording medium.

EXAMPLE 18 dye represented by formula (36) was dissolved in methylene chloride to prepare a 2% solution. The solution was applied to 1.2-mm thick glass substrate by a spin coater. The dye layer was dried to prepare a 70-nm thick recording layer, thereby obtaining a recording medium.

EXAMPLE 19

15% by weight of acrylic resin (Dianal BR-60: tradename available from Mitsubishi Rayon Co., Ltd.) as a binder resin was added to a dye represented by formula (33), and the mixture was dissolved in methyl ethyl ketone to prepare a 3% solution. The solution was applied to a 1.2-mm thick glass substrate by a spin coater. The dye layer was dried to prepare a 90-nm thick recording layer, thereby obtaining a recording medium.

EXAMPLE 20

A dye represented by formula (3) was mixed with an infrared absorber (IRG-003: tradename available from NIPPON KAYAKU CO., LTD.) at a weight ratio of 3 : 1, and the mixture was dissolved in methyl ethyl ketone to prepare a 2% solution. The solution was applied to a 1.2-mm thick glass substrate by a spin coater. The dye layer was dried to prepare a 70-nm thick recording layer, thereby obtaining a recording medium.

EXAMPLE 21

A dye represented by formula (32) was mixed with a dye represented by formula (a) used in Example 7 at a weight ratio of 2 : 1, and the mixture was dissolved following the same procedures as in Example 1. The solution was applied to a substrate as in Example 1 and dried to form a 80-nm thick recording layer, thereby obtaining a recording medium.

EXAMPLE 22

Following the same procedures as in Example 15, a dye represented by formula (3)) was applied to a glass substrate to form a 60-nm thick recording layer. Aluminum naphthalocyanine represented by formula (b) used in Example 8 was heated and vacuum-deposited on the recording layer at a vacuum of $1.0 \times 10^{-5}$ Torr to form a 30-nm thick reflecting protective layer on the recording layer, thereby preparing a recording medium.

The same tests as described above were performed for the recording media in Examples 15 to 22. Results are summarized in Table 3 below.

TABLE 3

| | Organic Dye | Recording Sensitivity (mJ/spot) | C/N Value (dB) | Film Formation Properties | Heat and Moisture Resistance Test | | Light Resistance Test | |
|---|---|---|---|---|---|---|---|---|
| | | | | | Rate of Decrease in Absorbance | Rate of Decrease in Reflectance | Rate of Decrease in Absorbance | Rate of Decrease in Reflectance |
| Example 15 | Formula (32) | 2.8 | 56 | ⊚ | 7 | 6 | 6 | 6 |
| Example 16 | Formula (33) | 2.8 | 54 | ⊚ | 5 | 7 | 4 | 7 |
| Example 17 | Formula (34) | 2.9 | 55 | ⊚ | 6 | 6 | 6 | 6 |
| Example 18 | Formula (36) | 2.7 | 55 | ⊚ | 4 | 5 | 8 | 5 |
| Example 19 | Formula (33) | 3.5 | 53 | ⊚ | 5 | 3 | 5 | 4 |
| Example 20 | Formula (35) | 3.0 | 55 | ⊚ | 5 | 6 | 5 | 5 |
| Example 21 | Formula (32) + Formula (a) | 2.9 | 56 | ⊚ | 5 | 6 | 4 | 5 |
| Example 22 | Formula (32) | 3.0 | 55 | ⊚ | 4 | 4 | 4 | 4 |

TABLE 3-continued

|  | Recording Sensitivity (mJ/spot) | C/N Value (dB) | Film Formation Properties | Heat and Moisture Resistance Test | | Light Resistance Test | |
|---|---|---|---|---|---|---|---|
| Organic Dye | | | | Rate of Decrease in Absorbance | Rate of Decrease in Reflectance | Rate of Decrease in Absorbance | Rate of Decrease in Reflectance |
| + Formula (b) | | | | | | | |

EXAMPLE 23

A dye represented by formula (38) was dissolved in methyl ethyl ketone to prepare a 2% solution. The solution was applied to a 1.2-mm thick glass substrate by a spin coater. The dye layer was dried to prepare a 70-nm thick recording layer, thereby obtaining a recording medium.

EXAMPLE 24

A dye represented by formula (42) was dissolved in methylene chloride to prepare a 2% solution. The solution was applied to a 1.2-mm thick glass substrate by a spin coater. The dye layer was dried to prepare a 75-nm thick recording layer, thereby obtaining a recording medium.

EXAMPLE 25

A dye represented by formula (46) was dissolved in methylene chloride to prepare a 2% solution. The solution was applied to a 1.2-mm thick glass substrate by a spin coater. The dye layer was dried to prepare a 70-nm thick recording layer, thereby obtaining a recording medium.

EXAMPLE 26

A dye represented by formula (48) was dissolved in methylene chloride to prepare a 2% solution. The solution was applied to a 1.2-mm thick glass substrate by a spin coater. The dye layer was dried to prepare a 75-nm thick recording layer, thereby obtaining a recording medium.

The dye layer was dried to prepare an 80-nm thick recording layer, thereby obtaining a recording medium.

EXAMPLE 28

A dye represented by formula (39) was mixed with an infrared absorber (IRG-003: tradename available from NIPPON KAYAKU CO., LTD.) at a weight ratio of 3 : 1, and the mixture was dissolved in methyl ethyl ketone to prepare a 2% solution. The solution was applied to a 1.2-mm thick glass substrate by a spin coater. The dye layer was dried to prepare a 70-nm thick recording layer, thereby obtaining a recording medium.

EXAMPLE 29

A dye represented by formula (48) was mixed with a dye represented by formula (a) used in Example 7 at a weight ratio of 2 : 1, and the mixture was dissolved following the same procedures as in Example 23. The solution was applied and dried to form a 75-nm thick recording layer, thereby obtaining a recording medium.

EXAMPLE 30

Following the same procedures as in Example 23, a dye represented by formula (38) was applied to a glass substrate to form a 60-nm thick recording layer. Aluminum naphthalocyanine represented by formula (b) used in Example 8 was heated and vacuum-deposited on the recording layer at a vacuum of $1.0 \times 10^{-5}$ Torr to form a 30-nm thick reflecting protective layer on the recording layer, thereby preparing a recording medium.

The same tests as described above were performed for the recording media in Examples 23 to 30. Results are summarized in Table 4 below.

TABLE 4

| | Organic Dye | Recording Sensitivity (mJ/spot) | C/N Value (dB) | Film Formation Properties | Heat and Moisture Resistance Test | | Light Resistance Test | |
|---|---|---|---|---|---|---|---|---|
| | | | | | Rate of Decrease in Absorbance | Rate of Decrease in Reflectance | Rate of Decrease in Absorbance | Rate of Decrease in Reflectance |
| Example 23 | Formula (38) | 3.0 | 55 | ◎ | 5 | 6 | 6 | 5 |
| Example 24 | Formula (42) | 3.1 | 54 | ◎ | 6 | 6 | 6 | 7 |
| Example 25 | Formula (46) | 2.8 | 56 | ◎ | 7 | 4 | 7 | 5 |
| Example 26 | Formula (48) | 2.8 | 56 | ◎ | 5 | 6 | 6 | 7 |
| Example 27 | Formula (42) | 3.6 | 54 | ◎ | 4 | 5 | 4 | 6 |
| Example 28 | Formula (39) | 3.3 | 55 | ◎ | 7 | 6 | 3 | 4 |
| Example 29 | Formula (48) + Formula (a) | 3.0 | 56 | ◎ | 5 | 6 | 5 | 5 |
| Example 30 | Formula (38) + Formula (b) | 2.9 | 55 | ◎ | 3 | 3 | 3 | 4 |

EXAMPLE 27

10% by weight of acrylic resin (Dianal BR-60: tradename available from Mitsubishi Rayon Co., Ltd.) as a binder resin was added to a dye represented by formula (42), and the mixture was dissolved in methyl ethyl ketone to prepare a 3% solution. The solution was applied to a 1.2-mm thick glass substrate by a spin coater.

EXAMPLE 31

A dye represented by formula (51) was dissolved in dichloromethane to prepare a 2% solution. The solution was applied to a 1.2-mm thick glass substrate by a spinner coater and was then dried to prepare a 70-nm thick recording layer, thereby obtaining a recording medium.

The reflectance of the recording layer of the resultant recording medium was measured by a spectroscope to be 29% at the substrate side at a wavelength of 830 nm. A semiconductor laser beam having a wavelength of 830 nm was focused to form a 1.2-μm diameter beam spot on the recording medium, and the laser spot having an output power of 7 mW was scanned at a linear rate of 6 m/sec from the substrate side so as to write a 1-MHz signal. In this case, the recording sensitivity was 2.5 mJ/spot, and the read C/N value was 55 dB.

The absorbance of the recording medium prepared in Example 31 was measured by an absorbance meter (spectrophotometer 330: tradename available from Hitachi, Ltd.) at a scanning rate of 300 nm/min. Resultant characteristics are shown in FIG. 4.

EXAMPLE 32

A dye represented by formula (56) was mixed with an infrared absorber (IRG-002: tradename available from NIPPON KAYAKU CO., LTD.) at a weight ratio of 4 : 1, and the resultant mixture was dissolved in methyl ethyl ketone to prepare a 2% solution. The solution was applied by a spinner coater to a 1.2-mm thick glass plate treated with n ultraviolet curing resin. The resultant layer was dried to form a 60-nm recording layer, thereby preparing a recording medium.

The reflectance of the recording layer of the resultant recording medium was measured by a spectroscope to be 28% at the substrate side at a wavelength of 830 nm. Following the same procedures as in Example 31, read and write operations were performed by using a semiconductor laser. Recording sensitivity was 2.8 mJ/spot, and the read C/N value was 53 dB.

EXAMPLE 33

10% by weight of acrylic resin (Dianal BR-60: tradename available from Mitsubishi Rayon Co., Ltd.) as a binder resin was added to a dye represented by formula (51), and the mixture was dissolved in methyl ethyl ketone to prepare a 3% solution. The solution was applied by a spinner coater to a 1.2-mm thick glass substrate treated with an ultraviolet curing resin. The dye layer was dried to prepare a 70-nm thick recording layer, thereby obtaining a recording medium.

The reflectance of the recording layer of the resultant recording medium was measured by a spectroscope to be 30% at the substrate side at a wavelength of 830 nm. Following the same procedures as in Example 31, read and write operations were performed by using a semiconductor laser. Recording sensitivity was 2.7 mJ/spot, and the read C/N vale was 53 dB.

EXAMPLE 34

Following the same procedures as in Example 31, a dye represented by formula (55) was applied to a glass substrate and was then dried to form a 60-nm thick recording layer. Aluminum naphthalocyanine represented by formula (b) used in Example 8 was heated and vacuum-deposited on the recording layer at a vacuum of $1.0 \times 10^{-5}$ Torr to form a 25-nm thick reflecting protective layer on the recording layer, thereby preparing a recording medium.

The reflectance of the recording layer of the resultant recording medium was measured by a spectroscope to be 30% at the substrate side at a wavelength of 830 nm. Following the same procedures as in Example 31, read and write operations were performed by using a semiconductor laser. Recording sensitivity was 2.6 mJ/spot, and the read C/N value was 54 dB.

COMPARATIVE EXAMPLE 6

A dye represented by the following formula (vi) was dissolved in methyl ethyl ketone to prepare a 2% solution. The solution was applied by a spinner coater to a 1.2-mm acrylic plate treated with an ultraviolet curing resin to form a 80-nm thick recording layer, thereby obtaining a recording medium.

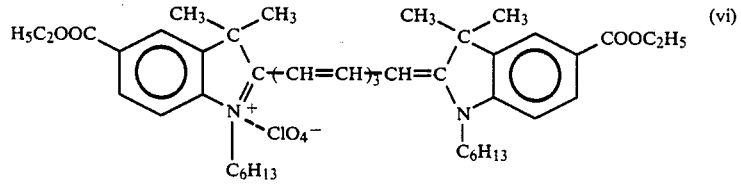

The reflectance of the recording layer of the resultant recording medium was measured by a spectroscope to be 32% at the substrate side at a wavelength of 830 m. Following the same procedures as in Example 31, read and write operations were performed by using a semiconductor laser. Recording sensitivity was 2.9 mJ/spot, and the read C/N value was 50 dB.

COMPARATIVE EXAMPLE 7

A dye represented by formula (iv) was dissolved in dichloromethane to prepare a 2% solution. The solution was applied by a spinner coater to a 1.2-mm thick glass plate treated with an ultraviolet curing resin to form a 75-nm thick recording layer, thereby preparing a recording medium.

The reflectance of the recording layer of the resultant recording medium was measured by a spectroscope to be 31% at the substrate side at a wavelength of 830 nm. Following the same procedures as in Example 31, read and write operations were performed by using a semiconductor laser. Recording sensitivity was 2.6 mJ/spot, and the read C/N value was 51 dB.

COMPARATIVE EXAMPLE 8

A dye represented by the following formula (vii) was dissolved in dichloromethane to prepare a 2% solution. The solution was applied by a spinner coater to a 1.2-mm thick glass plate treated with an ultraviolet curing resin to form a 75-nm thick recording layer, thereby preparing a recording medium.

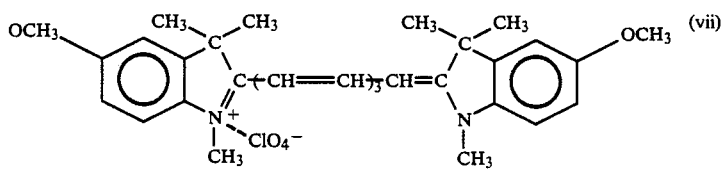

The reflectance of the recording layer of the resultant recording medium was measured by a spectroscope to be 30% at the substrate side at a wavelength of 830 nm. Following the same procedures as in Example 31, read and write operations were performed by using a semiconductor laser. Recording sensitivity was 3.1 mJ/spot, and the read C/N value was 51 dB.

The recording media prepared in Examples 31 to 34 and Comparative Examples 6 to 8 were exposed in an atmosphere having a temperature of 50° C. and a humidity of 95% for 500 hours to measure rates of decreases in reflectances before and after the heat and moisture resistance test. A light resistance test was performed for each recording layer such that a 500-W tungsten bema was incident on the layer surface from a position spaced apart by 50 cm from the layer surface in an atmosphere having a temperature of 25° C. and a humidity of 60% for 100 hours, thereby measuring the rate of decrease in reflectance. In addition, a continuous laser beam having a power of 1 mW was incident on each recording medium in a read degradation acceleration test for 30 minutes so as to measure changes in C/N value. Results are summarized in Table 5 below.

Table 5

| | Heat and Moisture Resistance Test (Rate of Decrease in Reflectance) | Light Resistance Test (Rate of Decrease in Reflectance) | Read Degradation (C/N Value) | Film Formation Properties |
|---|---|---|---|---|
| Example 31 | 7 | 6 | 50 | ○ |
| 32 | 9 | 7 | 48 | ○ |
| 33 | 6 | 5 | 50 | ○ |
| 34 | 6 | 4 | 50 | ○ |
| Comparative Example 6 | 35 | 23 | Measurement failure due to degradation | — |
| 7 | 14 (some crystals are precipitated) | 13 | 40 | Δ~X |
| 8 | 35 | 17 | 36 | ○ |

As described in detail, according to the present invention, there is provided an optical information recording medium having a high reflectance and high recording sensitivity. According to this recording medium, an optical signal can be stably written and read out. In addition, the recording medium has high stability against the read light, sunbeams, and humidity and is nontoxic.

What is claimed is:

1. An optical information recording medium, which is capable of recording signals for retrieval, based on differences or changes in reflectivity, comprising:
   an optical information recording layer; and
   a carrier carrying said recording layer,
   said recording layer comprising an organic dye represented by the formula:

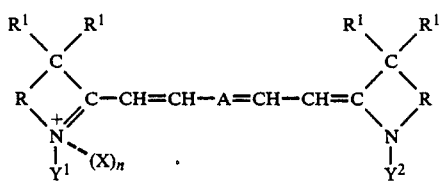

where
R is 1,2-naphthylene group, 2,3-naphthylene group or 3,4-naphthylene group;
n is 1;
$R^1$ is an alkyl group having 1 to 6 carbon atoms, an aralkyl group or phenyl group;
A is

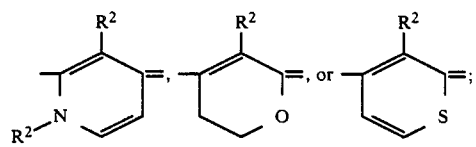

$R^2$ is a hydrogen atom, a halogen atom, an alkyl group having 1 to 6 carbon atoms,

where pH is phenyl group, or

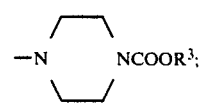

$R^3$ is an alkyl group having 1 to 6 carbon atoms;

X is an anion selected from an anion group consisting of perchlorate, fluoroborate, iodide, chloride, bromide or p-toluenesulfonate;

$Y^1$ is an alkyl group having 1 to 18 carbon atoms, $-R^4OR^5$, $-R^4COR^5$, or $-R^4COOR^5$;

$Y^2$ is the same as $Y^1$;

$R^4$ is an alkylene group having 1 to 20 carbon atoms; and $R^5$ is an alkyl group having 1 to 18 carbon atoms, or a phenyl group.

2. The recording medium of claim 1 wherein A is

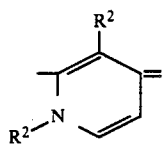

3. The recording medium of claim 1 wherein A is

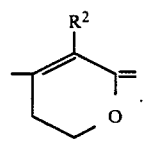

4. The recording medium of claim 1 wherein A is

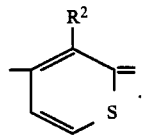

5. The recording medium of claim 1 wherein $R^2$ is a hydrogen, a halogen or an alkyl group with 1 to 6 carbon atoms.

6. The recording medium of claim 1 wherein $R^2$ is halogen.

7. The recording medium of claim 1 wherein $R^2$ is hydrogen.

8. The recording medium of claim 1 wherein $R^2$ is an alkyl group with 1 to 6 carbon atoms.

9. The recording medium of claim 1 wherein $R^2$ is $-N(Ph)_2$ wherein Ph is phenyl.

10. The recording medium of claim 1 wherein $R^2$ is

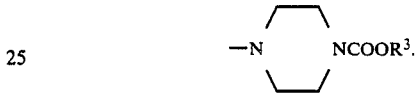

11. The recording medium of claim 1 wherein $Y^1$ is alkyl with 1 to 18 carbon atoms.

12. The recording medium of claim 1 wherein $Y^1$ is $R^4OR^5$, $R^4COR^5$ or $R^4COOR^5$.

* * * * *